US011854141B2

(12) United States Patent
Muthler et al.

(10) Patent No.: US 11,854,141 B2
(45) Date of Patent: Dec. 26, 2023

(54) EARLY RELEASE OF RESOURCES IN RAY TRACING HARDWARE

(71) Applicant: NVIDIA Corporation, Santa Clara, CA (US)

(72) Inventors: Gregory Muthler, Austin, TX (US); John Burgess, Austin, TX (US); Ronald Charles Babich, Jr., Murrysville, CA (US); William Parsons Newhall, Jr., Woodside, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/968,485

(22) Filed: Oct. 18, 2022

(65) Prior Publication Data

US 2023/0041724 A1 Feb. 9, 2023

Related U.S. Application Data

(63) Continuation of application No. 16/905,844, filed on Jun. 18, 2020, now Pat. No. 11,508,112.

(51) Int. Cl.
*G06T 15/06* (2011.01)
*G06T 17/10* (2006.01)
(Continued)

(52) U.S. Cl.
CPC ............. *G06T 15/06* (2013.01); *G06F 9/48* (2013.01); *G06F 9/5027* (2013.01); *G06T 17/10* (2013.01); *G06T 2210/21* (2013.01)

(58) Field of Classification Search
None
See application file for complete search history.

(56) References Cited

U.S. PATENT DOCUMENTS

| 8,502,819 | B1 | 8/2013 | Aila |
| 9,552,664 | B2 | 1/2017 | Laine et al. |

(Continued)

OTHER PUBLICATIONS

Appel, Arthur, "Some techniques for shading machine renderings of solids," AFIPS Conference Proceedings: 1968 Spring Joint Computer Conference, 9 pages.

(Continued)

*Primary Examiner* — Tapas Mazumder
(74) *Attorney, Agent, or Firm* — Nixon & Vanderhye, P.C.

(57) ABSTRACT

Techniques are disclosed for improving the throughput of ray intersection or visibility queries performed by a ray tracing hardware accelerator. Throughput is improved, for example, by releasing allocated resources before ray visibility query results are reported by the hardware accelerator. The allocated resources are released when the ray visibility query results can be stored in a compressed format outside of the allocated resources. When reporting the ray visibility query results, the results are reconstructed based on the results stored in the compressed format. The compressed format storage can be used for ray visibility queries that return no intersections or terminate on any hit ray visibility query. One or more individual components of allocated resources can also be independently deallocated based on the type of data to be returned and/or results of the ray visibility query.

16 Claims, 24 Drawing Sheets

Example Ray Tracing Shading Pipeline

(51) Int. Cl.
  *G06F 9/48* (2006.01)
  *G06F 9/50* (2006.01)

(56) References Cited

U.S. PATENT DOCUMENTS

| | | | |
|---|---|---|---|
| 9,569,559 | B2 | 2/2017 | Karras et al. |
| 9,582,607 | B2 | 2/2017 | Laine et al. |
| 10,025,879 | B2 | 7/2018 | Karras et al. |
| 10,331,632 | B2 | 6/2019 | Karras et al. |
| 2010/0231589 | A1* | 9/2010 | Salsbury ............ G06T 15/06 345/426 |
| 2014/0168238 | A1 | 6/2014 | Luebke |
| 2016/0070767 | A1 | 3/2016 | Karras et al. |
| 2016/0070820 | A1* | 3/2016 | Laine ............ G06T 15/005 707/797 |
| 2016/0071234 | A1 | 3/2016 | Lehtinen et al. |
| 2020/0050451 | A1 | 2/2020 | Babich et al. |
| 2020/0050550 | A1 | 2/2020 | Muthler et al. |
| 2020/0051312 | A1 | 2/2020 | Muthler et al. |
| 2020/0051314 | A1 | 2/2020 | Laine et al. |
| 2020/0051315 | A1 | 2/2020 | Laine et al. |
| 2020/0051316 | A1 | 2/2020 | Laine et al. |
| 2020/0051318 | A1 | 2/2020 | Muthler et al. |

OTHER PUBLICATIONS

Foley, James D., et al., "Computer Graphics: Principles and Practice," 2nd Edition Addison-Wesley 1996 and 3rd Edition Addison-Wesley 2014.
Hery, Christophe, et al., "Towards Bidirectional Path Tracing at Pixar," 2016, 20 pages.
Kajiya, James T., "The Rendering Equation," SIGGRAPH, vol. 20, No. 4, 1986, pp. 143-150.
Parker, Steven G., et al., "OptiX: A General Purpose Ray Tracing Engine," ACM Transactions on Graphics, vol. 29, Issue 4, Article No. 66, Jul. 2010, 13 pages.
Whitted, Turner, "An Improved Illumination Model for Shaded Display," Communications of the ACM, vol. 23, No. 6, Jun. 1990, pp. 343-349.
Woop, Sven, "A Ray Tracing Hardware Architecture for Dynamic Scenes," Thesis, Universität des Saarlandes, 2004, 100 pages.
Lefrancois et al., NVIDIA Vulkan Ray Tracing Tutorial, Dec. 2019, https://developer.nvidia.com/rtx/raytracing/vkray.
https://developer.nvidia.com/rtx/raytracing.
Glassner, Andrew, "An Introduction to Ray Tracing," Morgan Kaufmann, 1989.
Office Action dated Jul. 11, 2019, issued in U.S. Appl. No. 16/101,066.

* cited by examiner

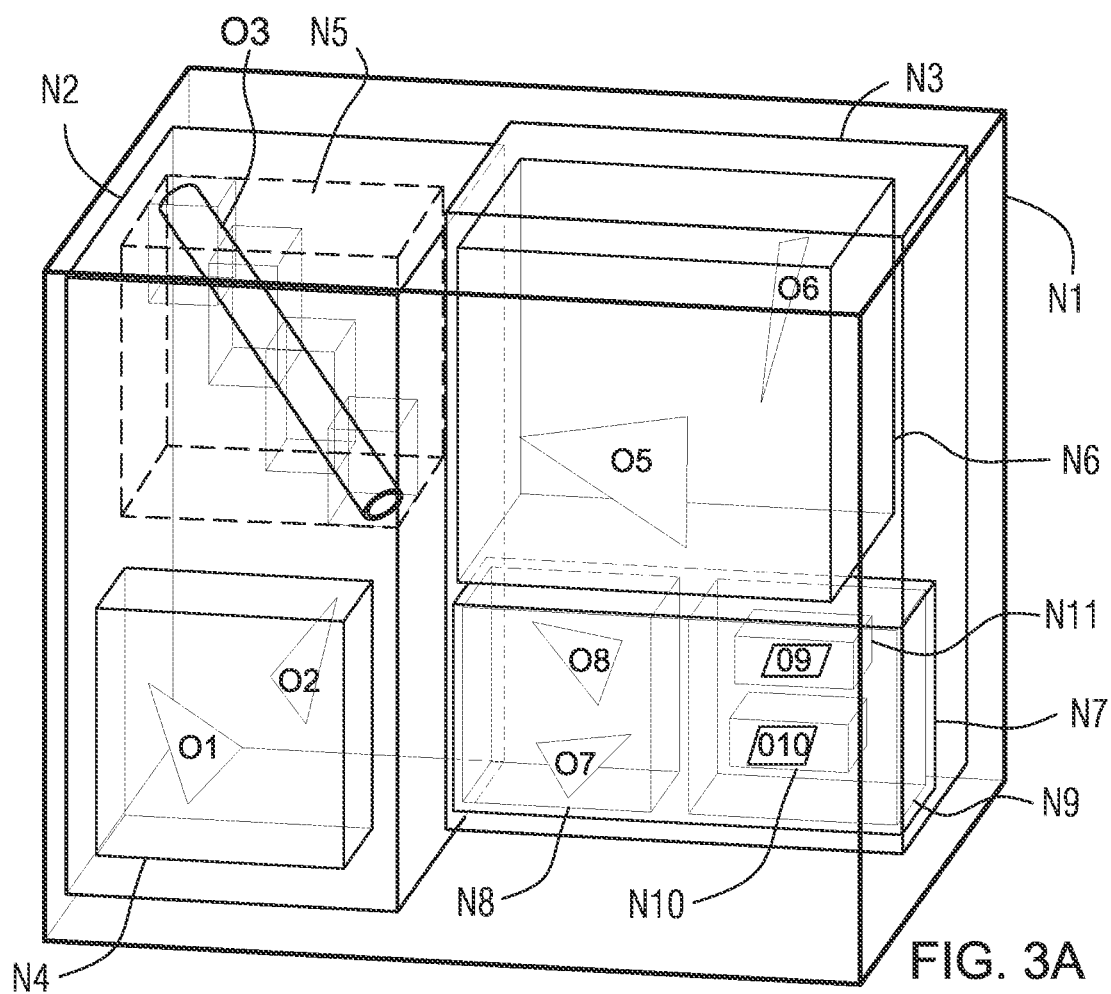

Example Ray Tracing Shading Pipeline

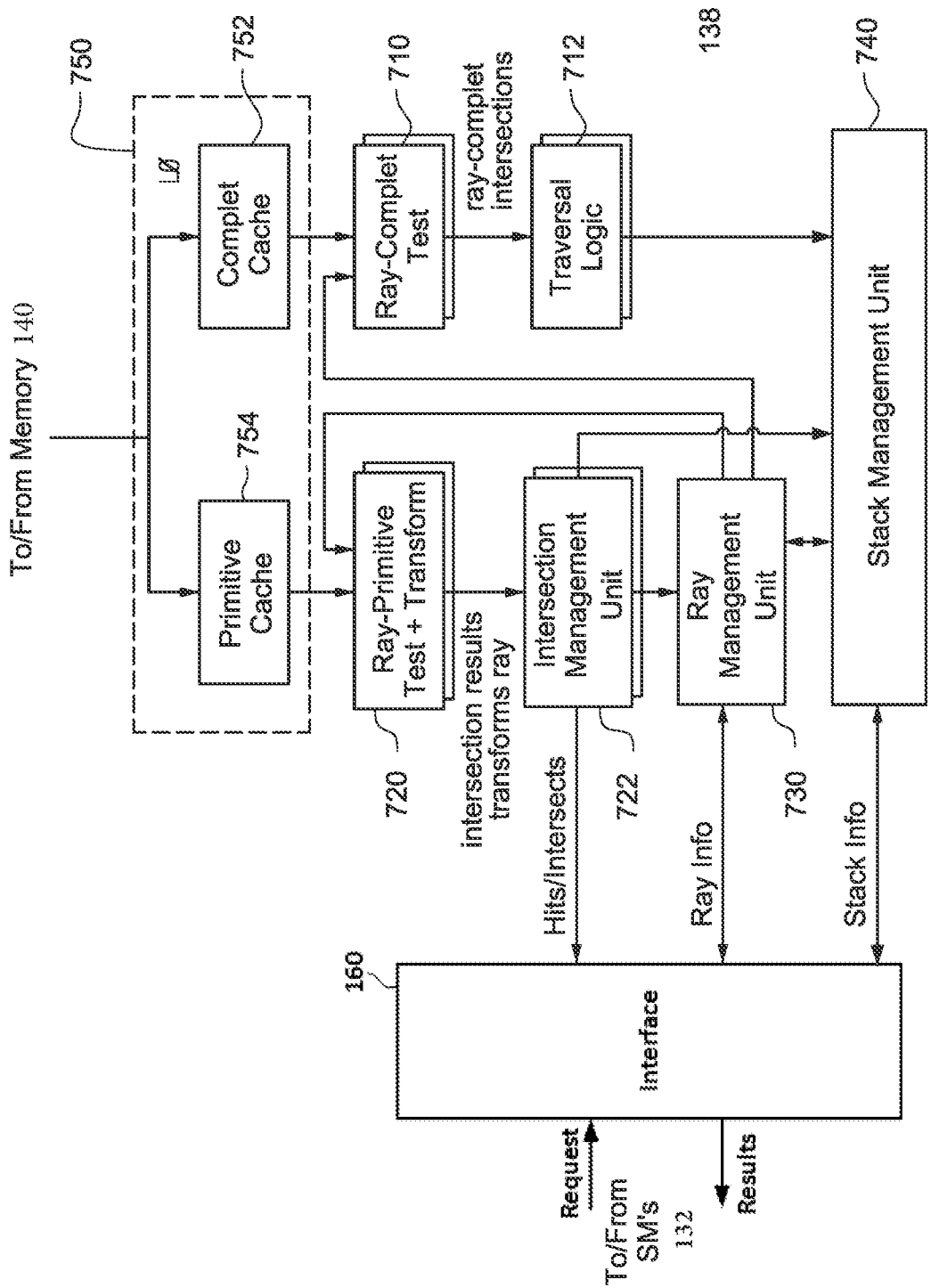
FIG. 7 TRAVERSAL COPROCESSOR

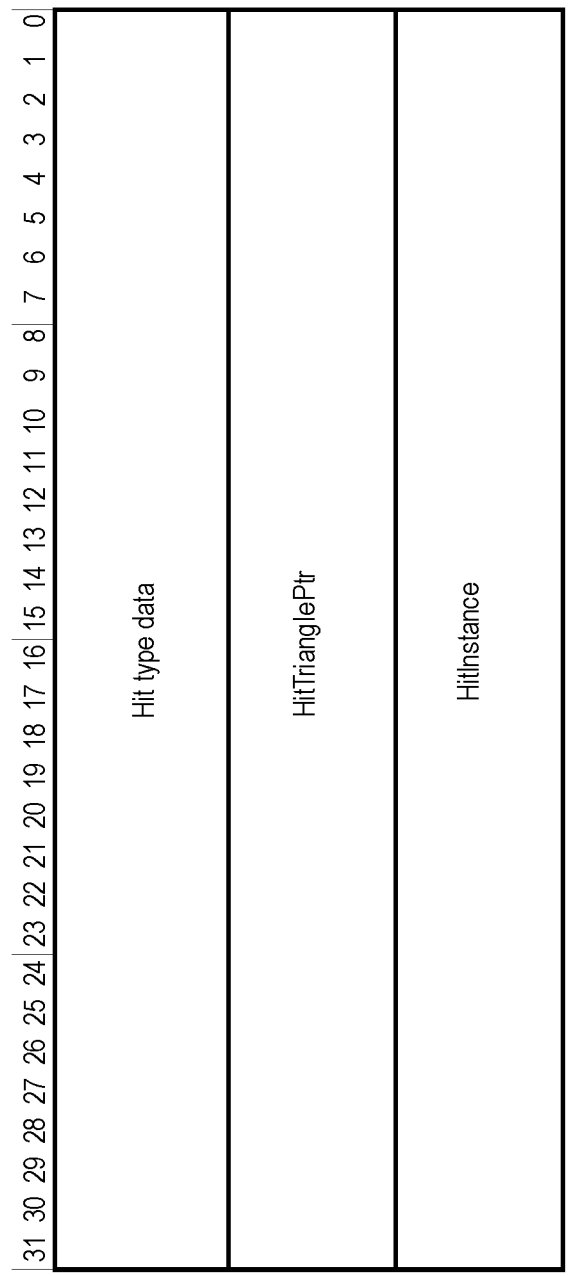

| Stack Data | meta | stack0lo | stack0hi | stack1lo | stack1hi | stack2lo | stack2hi | * ° * | stacknlo | stacknhi |

FIG. 10B

Transformed Ray Data: originX, originY, originZ, dirX, dirY, dirZ

FIG. 10C

Ray setup

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Write flags and rayOP parameters (tu) ||||||||||||||||||||||||||||||||
| timestamp (motion blur) ||||||||||||||||||||||||||||||||

FIG. 11

HitType_Triangle

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Type ||| TriangleID, intersection (t u v), a and f information ||||||||||||||||||||||||||||| f  1b  facing: 0=front, 1=back.
a  1b  alpha: 0=opaque, 1=alpha

FIG. 12A

HitType_TriangleUnknown

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Type |||                             |||||||||||||||||||||||||||||

FIG. 12B

HitType_NodeRef

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Type | | | | | | | | Node Data | | | | | | | | | | | | | | | | | | | | | | | |

FIG. 12C

HitType_TriRange

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Type | | | | | | | | Triangle Range Data | | | | | | | | | | | | | | | | | | | | | | | |

FIG. 12D

HitType_ItemRange

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| Type | | | | | | | | Item Range Data | | | | | | | | | | | | | | | | | | | | | | | |

FIG. 12E

HitType_InstanceNode

| 31 30 29 28 27 26 25 24 | 23 22 21 20 19 18 17 16 | 15 14 13 12 11 10 9 8 | 7 6 5 4 3 2 1 0 |
|---|---|---|---|
| Type | | Instance Node Data | |

FIG. 12F

HitType_Error

| 31 30 29 28 27 26 25 24 | 23 22 21 20 19 18 17 16 | 15 14 13 12 11 10 9 8 | 7 6 5 4 3 2 1 0 |
|---|---|---|---|
| Type | | errorCode | |

FIG. 12G

HitType_None

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| Type | | | | | | | | | | | | | | | | | | | | | | | | | | | | | | | |

FIG. 12H

| Thread ID | TTU Slots Per Ray | | | | Any Hit | No Hit | Active |
|---|---|---|---|---|---|---|---|
| | TTU Slot | RMU Slot | IMU Slot | SMU Slot | | | |
| 23 | 2 | 4 | 6 | 5 | 0 | 0 | 1 |
| 16 | 3 | 3 | 3 | 2 | 0 | 0 | 1 |
| 16 | - | - | - | - | 0 | 1 | 0 |
| 8 | - | - | - | - | 1 | 0 | 0 |
| 2 | 1 | 1 | 2 | 1 | 0 | 0 | 0 |
| 4 | 4 | 5 | 5 | - | 0 | 0 | 0 |
| 5 | 5 | 2 | 1 | 3 | 0 | 0 | 0 |
| 1 | | | | | | 0 | 0 |

FIG. 13A

| RMU Remap Table | |
|---|---|
| TTU Slot | RMU Slot |
| 2 | 4 |
| 3 | 3 |
| 1 | 1 |
| 4 | 5 |
| 5 | 2 |

| IMU Remap Table | |
|---|---|
| TTU Slot | IMU Slot |
| 2 | 6 |
| 3 | 3 |
| 1 | 2 |
| 4 | 5 |
| 5 | 1 |

| SMU Remap Table | |
|---|---|
| TTU Slot | SMU Slot |
| 2 | 5 |
| 3 | 2 |
| 1 | 1 |
| 5 | 3 |

FIG. 13B

TTU Processing

Example Process To Generate an Image

EARLY RELEASE OF RESOURCES IN RAY TRACING HARDWARE

CROSS-REFERENCE TO RELATED PATENTS AND APPLICATIONS

This application is a continuation of Ser. No. 16/905,844 filed Jun. 18, 2020 and is related to the following commonly-assigned US patents and patent applications, the entire contents of each of which are incorporated by reference:

U.S. application Ser. No. 14/563,872 titled "Short Stack Traversal of Tree Data Structures" filed Dec. 8, 2014;

U.S. Pat. No. 9,582,607 titled "Block-Based Bounding Volume Hierarchy";

U.S. Pat. No. 9,552,664 titled "Relative Encoding For A Block-Based Bounding Volume Hierarchy";

U.S. Pat. No. 9,569,559 titled "Beam Tracing";

U.S. Pat. No. 10,025,879 titled "Tree Data Structures Based on a Plurality of Local Coordinate Systems";

U.S. application Ser. No. 14/737,343 titled "Block-Based Lossless Compression of Geometric Data" filed Jun. 11, 2015;

U.S. patent application Ser. No. 16/101,066 titled Method for Continued Bounding Volume Hierarchy Traversal on Intersection Without Shader Intervention;

U.S. patent application Ser. No. 16/101,109 titled "Method for Efficient Grouping of Cache Requests for Datapath Scheduling";

U.S. patent application Ser. No. 16/101,247 titled "A Robust, Efficient Multiprocessor-Coprocessor Interface";

U.S. patent application Ser. No. 16/101,180 titled "Query-Specific Behavioral Modification of Tree Traversal";

U.S. patent application Ser. No. 16/101,148 titled "Conservative Watertight Ray Triangle Intersection";

U.S. patent application Ser. No. 16/101,196 titled "Method for Handling Out-of-Order Opaque and Alpha Ray/Primitive Intersections"; and U.S. patent application Ser. No. 16/101,232 titled "Method for Forward Progress and Programmable Timeouts of Tree Traversal Mechanisms in Hardware".

FIELD

The present technology relates to computer graphics, and more particularly to ray tracers. More particularly, the technology relates to hardware acceleration of computer graphics processing including but not limited to ray tracing. The example non-limiting technology herein also relates to a hardware-based ray intersection testing that efficiently determines ray intersections e.g., for real time ray tracing. Still more particularly, the example non-limiting technology herein relates to data compression and/or early release of allocated ray-tracing hardware resources.

BACKGROUND

Real time computer graphics have advanced tremendously over the last 30 years. With the development in the 1980's of powerful graphics processing units (GPUs) providing 3D hardware graphics pipelines, it became possible to produce 3D graphical displays based on texture-mapped polygon primitives in real time response to user input. Such real time graphics processors were built upon a technology called scan conversion rasterization, which is a means of determining visibility from a single point or perspective. Using this approach, three-dimensional objects are modelled from surfaces constructed of geometric primitives, typically polygons such as triangles. The scan conversion process establishes and projects primitive polygon vertices onto a view plane and fills in the points inside the edges of the primitives. See e.g., Foley, Van Dam, Hughes et al, Computer Graphics: Principles and Practice (2d Ed. Addison-Wesley 1995 & 3d Ed. Addison-Wesley 2014).

Hardware has long been used to determine how each polygon surface should be shaded and texture-mapped and to rasterize the shaded, texture-mapped polygon surfaces for display. Typical three-dimensional scenes are often constructed from millions of polygons. Fast modern GPU hardware can efficiently process many millions of graphics primitives for each display frame (every $\frac{1}{30}^{th}$ or $\frac{1}{60}^{th}$ of a second) in real time response to user input. The resulting graphical displays have been used in a variety of real time graphical user interfaces including but not limited to augmented reality, virtual reality, video games and medical imaging. But traditionally, such interactive graphics hardware has not been able to accurately model and portray reflections and shadows.

There is another graphics technology which does perform physically realistic visibility determinations for reflection and shadowing. It is called "ray tracing". Ray tracing refers to casting a ray into a scene and determining whether and where that ray intersects the scene's geometry. This basic ray tracing visibility test is the fundamental primitive underlying a variety of rendering algorithms and techniques in computer graphics. Ray tracing was developed at the end of the 1960's and was improved upon in the 1980's. See e.g., Appel, "Some Techniques for Shading Machine Renderings of Solids" (SJCC 1968) pp. 27-45; Whitted, "An Improved Illumination Model for Shaded Display" Pages 343-349 Communications of the ACM Volume 23 Issue 6 (June 1980); and Kajiya, "The Rendering Equation", Computer Graphics (SIGGRAPH 1986 Proceedings, Vol. 20, pp. 143-150). Since then, ray tracing has been used in non-real time graphics applications such as design and film making. Anyone who has seen "Finding Dory" (2016) or other Pixar animated films has seen the result of the ray tracing approach to computer graphics—namely realistic shadows and reflections. See e.g., Hery et al, "Towards Bidirectional Path Tracing at Pixar" (2016).

Generally, ray tracing is a rendering method in which rays are used to determine the visibility of various elements in the scene. Ray tracing is a primitive used in a variety of rendering algorithms including for example path tracing and Metropolis light transport. In an example algorithm, ray tracing simulates the physics of light by modeling light transport through the scene to compute all global effects (including for example reflections from shiny surfaces) using ray optics. In such uses of ray tracing, an attempt may be made to trace each of many hundreds or thousands of light rays as they travel through the three-dimensional scene from potentially multiple light sources to the viewpoint. Often, such rays are traced relative to the eye through the scene and tested against a database of all geometry in the scene. The rays can be traced forward from lights to the eye, or backwards from the eye to the lights, or they can be traced to see if paths starting from the virtual camera and starting at the eye have a clear line of sight. The testing determines either the nearest intersection (in order to determine what is visible from the eye) or traces rays from the surface of an object toward a light source to determine if there is anything intervening that would block the transmission of light to that point in space. Because the rays are similar to the rays of light in reality, they make available a number of realistic effects that are not possible using the raster based real time 3D graphics technology that has been implemented over the last thirty years. Because each illuminating ray from each light source within the scene is evaluated as it passes through each object in the scene, the resulting images can appear as if they were photographed in reality. Accordingly, these ray tracing methods have long been used in professional graphics applications such as design and film, where they have come to dominate over raster-based rendering.

Ray tracing can be used to determine if anything is visible along a ray (for example, testing for occluders between a shaded point on a geometric primitive and a point on a light source) and can also be used to evaluate reflections (which may for example involve performing a traversal to determine the nearest visible surface along a line of sight so that software running on a streaming processor can evaluate a material shading function corresponding to what was hit—which in turn can launch one or more additional rays into the scene according to the material properties of the object that was intersected) to determine the light returning along the ray back toward the eye. In classical Whitted-style ray tracing, rays are shot from the viewpoint through the pixel grid into the scene, but other path traversals are possible. Typically, for each ray, the closest object is found. This intersection point can then be determined to be illuminated or in shadow by shooting a ray from it to each light source in the scene and finding if any objects are in between. Opaque objects block the light, whereas transparent objects attenuate it. Other rays can be spawned from an intersection point. For example, if the intersecting surface is shiny or specular, rays are generated in the reflection direction. The ray may accept the color of the first object intersected, which in turn has its intersection point tested for shadows. This reflection process is recursively repeated until a recursion limit is reached or the potential contribution of subsequent bounces falls below a threshold. Rays can also be generated in the direction of refraction for transparent solid objects, and again recursively evaluated. Ray tracing technology thus allows a graphics system to develop physically correct reflections and shadows that are not subject to the limitations and artifacts of scan conversion techniques.

Ray tracing has been used together with or as an alternative to rasterization and z-buffering for sampling scene geometry. It can also be used as an alternative to (or in combination with) environment mapping and shadow texturing for producing more realistic reflection, refraction and shadowing effects than can be achieved via texturing techniques or other raster "hacks". Ray tracing may also be used as the basic primitive to accurately simulate light transport in physically-based rendering algorithms such as path tracing, photon mapping, Metropolis light transport, and other light transport algorithms.

The main challenge with ray tracing has generally been speed. Ray tracing requires the graphics system to compute and analyze, for each frame, each of many millions of light rays impinging on (and potentially reflected by) each surface making up the scene. In the past, this enormous amount of computation complexity was impossible to perform in real time.

One reason modern GPU 3D graphics pipelines are so fast at rendering shaded, texture-mapped surfaces is that they use coherence efficiently. In conventional scan conversion, everything is assumed to be viewed through a common window in a common image plane and projected down to a single vantage point. Each triangle or other primitive is sent through the graphics pipeline and covers some number of pixels. All related computations can be shared for all pixels rendered from that triangle. Rectangular tiles of pixels corresponding to coherent lines of sight passing through the window may thus correspond to groups of threads running in lock-step in the same streaming processor. All the pixels falling between the edges of the triangle are assumed to be the same material running the same shader and fetching adjacent groups of texels from the same textures. In ray tracing, in contrast, rays may start or end at a common point (a light source, or a virtual camera lens) but as they propagate through the scene and interact with different materials, they quickly diverge. For example, each ray performs a search to find the closest object. Some caching and sharing of results can be performed, but because each ray potentially can hit different objects, the kind of coherence that GPU's have traditionally taken advantage of in connection with texture mapped, shaded triangles is not present (e.g., a common vantage point, window and image plane are not there for ray tracing). This makes ray tracing much more computationally challenging than other graphics approaches—and therefore much more difficult to perform on an interactive basis.

In 2010, NVIDIA took advantage of the high degree of parallelism of NVIDIA GPUs and other highly parallel architectures to develop the OptiX™ ray tracing engine. See Parker et al., "OptiX: A General Purpose Ray Tracing Engine" (ACM Transactions on Graphics, Vol. 29, No. 4, Article 66, July 2010). In addition to improvements in API's (application programming interfaces), one of the advances provided by OptiX™ was improving the acceleration data structures used for finding an intersection between a ray and the scene geometry. Such acceleration data structures are usually spatial or object hierarchies used by the ray tracing traversal algorithm to efficiently search for primitives that potentially intersect a given ray. OptiX™ provides a number of different acceleration structure types that the application can choose from. Each acceleration structure in the node graph can be a different type, allowing combinations of high-quality static structures with dynamically updated ones.

The OptiX™ programmable ray tracing pipeline provided significant advances, but was still generally unable by itself to provide real time interactive response to user input on relatively inexpensive computing platforms for complex 3D scenes. Since then, NVIDIA has been developing hardware acceleration capabilities for ray tracing. See e.g., U.S. Pat. Nos. 9,582,607; 9,569,559; US20160070820; US20160070767; and the other US patents and patent applications cited above.

A basic task for most ray tracers is to test a ray against all primitives (commonly triangles in one embodiment) in the scene and report either the closest hit (according to distance measured along the ray) or simply the first (not necessarily closest) hit encountered, depending upon use case. The naïve algorithm would be an O(n) brute-force search. However, due to the large number of primitives in a 3D scene of arbitrary complexity, it usually is not efficient or feasible for a ray tracer to test every geometric primitive in the scene for an intersection with a given ray.

By pre-processing the scene geometry and building a suitable acceleration data structure in advance, however, it is possible to reduce the average-case complexity to O(log n). Acceleration data structures, such as a bounding volume hierarchy or BVH, allow for quick determination as to which bounding volumes can be ignored, which bounding volumes may contain intersected geometric primitives, and which intersected geometric primitives matter for visualization and which do not. Using simple volumes such as boxes to contain more complex objects provides computational and memory efficiencies that help enable ray tracing to proceed in real time.

FIGS. 1A-1C illustrate ray tracing intersection testing in the context of a bounding volume including geometric mesh 20. FIG. 1A shows a ray 102 in a virtual space including bounding volumes 10 and 15. To determine whether the ray 102 intersects geometry in the mesh 20, each geometric primitive (e.g., triangle) could be directly tested against the ray 102. But to accelerate the process (since the object could contain many thousands of geometric primitives), the ray 102 is first tested against the bounding volumes 10 and 15. If the ray 102 does not intersect a bounding volume, then it does not intersect any geometry inside of the bounding volume and all geometry inside the bounding volume can be ignored for purposes of that ray. Because in FIG. 1A the ray 102 misses bounding volume 10, any geometry of mesh 20 within that bounding volume need not be tested for intersection. While bounding volume 15 is intersected by the ray 102, bounding volume 15 does not contain any geometry and so no further testing is required.

On the other hand, if a ray such as ray 104 shown in FIG. 1B intersects a bounding volume 10 that contains geometry, then the ray may or may not intersect the geometry inside of the bounding volume so further tests need to be performed on the geometry itself to find possible intersections. Because the rays 104, 106 in FIGS. 1B and 1C intersect a bounding volume 10 that contains geometry, further tests need to be performed to determine whether any (and which) of the primitives inside of the bounding volume are intersected. In FIG. 1B, further testing of the intersections with the primitives would indicate that even though the ray 104 passes through the bounding volume 10, it does not intersect any of the geometry the bounding volume encloses (alternatively, as mentioned above, bounding volume 10 could be further volumetrically subdivided so that a bounding volume intersection test could be used to reveal that the ray does not intersect any geometry or more specifically which geometric primitives the ray may intersect).

FIG. 1C shows a situation in which the ray intersects bounding volume 10 and contains geometry that ray 306 intersects. To perform real time ray tracing, an intersection tester tests each geometric primitive within the intersected bounding volume 10 to determine whether the ray intersects that geometric primitive.

The acceleration data structure most commonly used by modern ray tracers is a bounding volume hierarchy (BVH) comprising nested axis-aligned bounding boxes (AABBs). The leaf nodes of the BVH contain the primitives (e.g., triangles) to be tested for intersection. The BVH is most often represented by a graph or tree structure data representation. In ray tracing, the time for finding the closest (or for shadows, any) intersection for a ray is typically order O(log n) for n objects when such an acceleration data structure is used. For example, AABB bounding volume hierarchies (BVHs) of the type commonly used for modern ray tracing acceleration data structures typically have an O(log n) search behavior.

The BVH acceleration data structure represents and/or references the 3D model of an object or a scene in a manner that will help assist in quickly deciding which portion of the object a particular ray is likely to intersect and quickly rejecting large portions of the scene the ray will not intersect. The BVH data structure represents a scene or object with a bounding volume and subdivides the bounding volume into smaller and smaller bounding volumes terminating in leaf nodes containing geometric primitives. The bounding volumes are hierarchical, meaning that the topmost level encloses the level below it, that level encloses the next level below it, and so on. In one embodiment, leaf nodes can potentially overlap other leaf nodes in the bounding volume hierarchy.

NVIDIA's RTX platform includes a ray tracing technology that brings real-time, cinematic-quality rendering to content creators and game developers. See https://developer.nvidia.com/rtx/raytracing. In many or most implementations including NVIDIA RT Cores, the bounding volumes such as shown in FIG. 1A-1C use axis-aligned bounding boxes ("AABBs"), which can be compactly stored and easily tested for ray intersection. If a ray intersects against the bounding box of the geometry, then the underlying geometry is then tested as well. If a ray does not intersect against the bounding box of the geometry though, then that underlying geometry does not need to be tested. As FIGS. 1A-1C show, a hierarchy of AABB's is created to increase the culling effect of a single AABB bounding box test. This allows for efficient traversal and a quick reduction to the geometry of interest.

Given the great potential of improving real time ray tracing graphics processing systems for rendering high quality images by increasing processing speed or being able to increase scene complexity by using a larger number of primitives, further work is possible and desirable. In particular, it would be highly desirable to accelerate testing for ray intersections by increasing the throughput of ray intersection requests in ray tracing hardware.

BRIEF DESCRIPTION OF THE DRAWINGS

FIGS. 3A and 3B show example bounding volume hierarchy representations.

FIG. 7 shows a simplified example non-limiting traversal co-processor comprising a tree traversal unit (TTU).

FIGS. 10A-10D show examples of data that may be returned to the multiprocessor, according to some example embodiments.

FIG. 11 shows an example of ray information that can be provided by the multiprocessor for a thread.

FIG. 12A shows an example of data that may be provided by an Intersect Management Unit to indicate a hit and to provide intersection information.

FIG. 12B shows an example of data that may be generated by an interface to indicate a hit but without providing details about the hit.

FIG. 12C shows an example of data that may be provided by an intersect management unit to indicate a node hit.

FIG. 12D shows an example of data that may be provided by an intersect management unit to indicate a triangle range hit.

FIG. 12E shows an example of data that may be provided by an intersect management unit to indicate an item range hit.

FIG. 12F shows an example of data that may be provided by an intersect management unit to indicate an instance node hit.

FIG. 12G shows an example of data that may be provided by an intersect management unit to indicate an error in performing the ray intersection test.

FIG. 12H shows an example of data that may be generated by an interface to indicate a miss.

FIG. 13A shows a table of data that may be tracked by the interface, according to an example embodiment.

FIG. 13B shows mapping between TTU slots and ray management unit, intersection management unit and stack management unit slots, according to an example embodiment.

DETAILED DESCRIPTION OF NON-LIMITING EMBODIMENTS

Figure 1A:
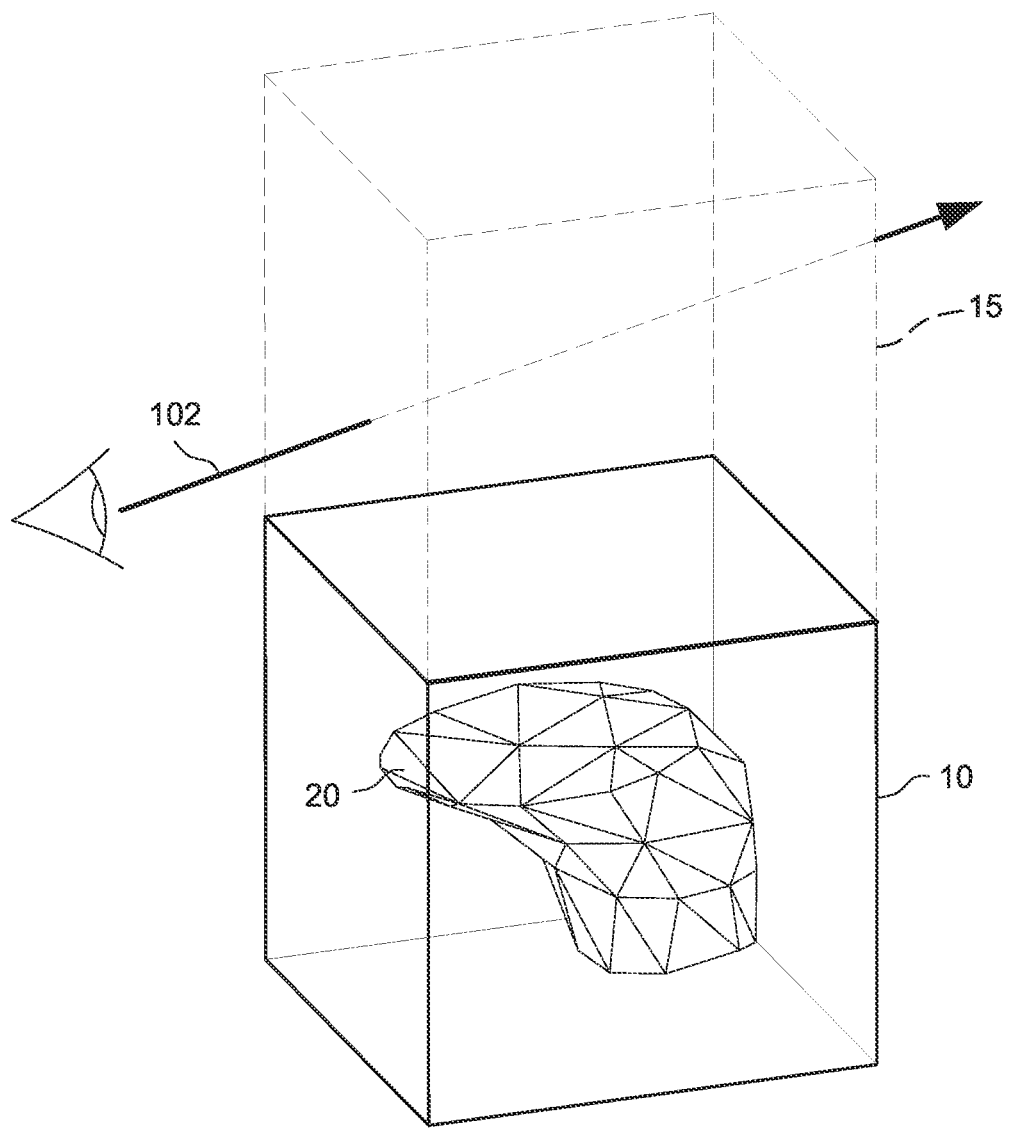
FIGS. 1A-1C show example simplified ray tracing tests to determine whether the ray passes through a bounding volume containing geometry and whether the ray intersects geometry within the bounding volume.
Figure 1B:
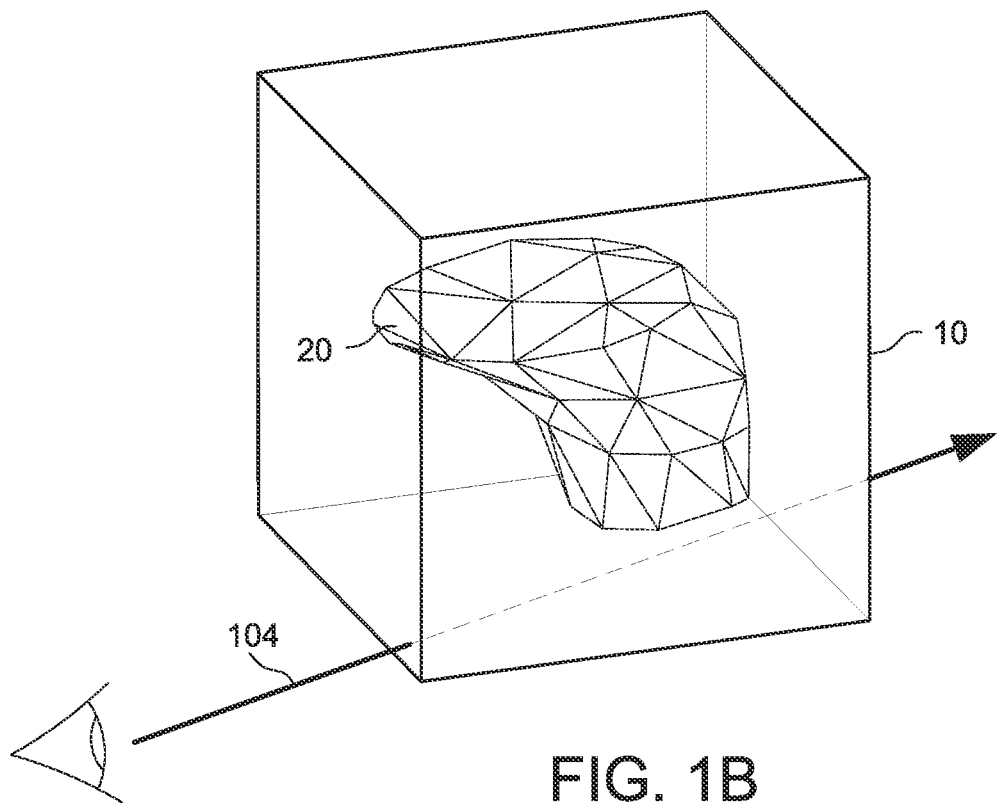
Figure 1C:
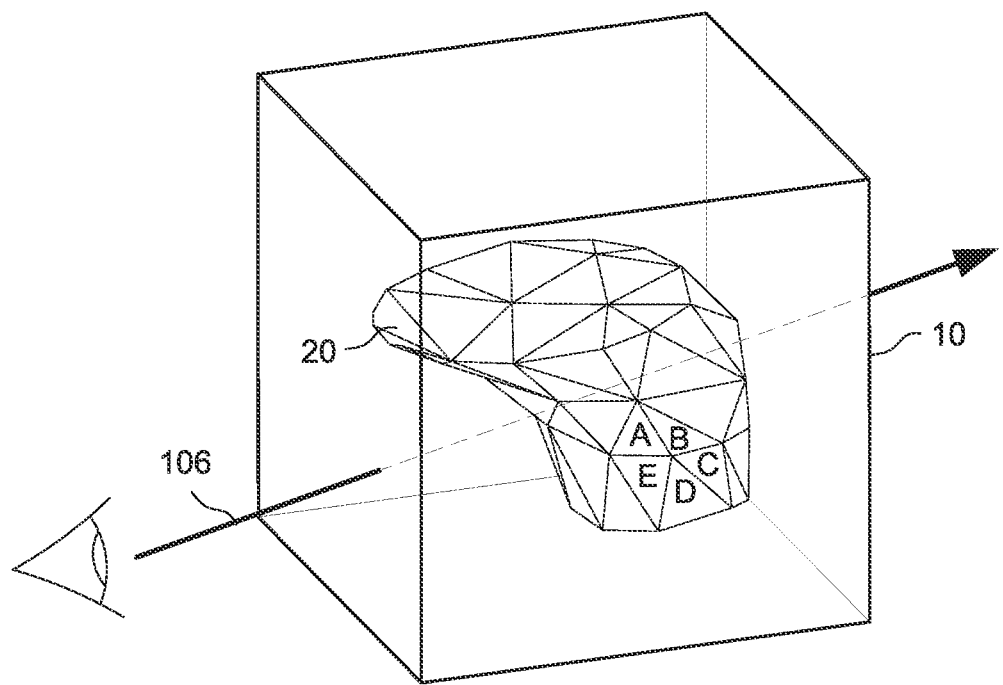

To achieve real time ray tracing, ray tracing hardware is designed to be very efficient and fast at performing ray intersection tests, i.e. testing for ray bounding volume and/or ray primitive intersections. In order to achieve this, the ray tracing hardware receives a group of ray intersection test queries from a processor, processes the queries and returns the results to the processor. Because the queries in the group can take different amount of time to complete, the results of completed queries are stored until the other queries in the group are processed and the results for the group are returned to the processor. The throughput of the ray tracing hardware is limited by consumption of resources used to the store the query results until they are reported. To further increase the throughput of the queries, memory for storing the results until they are reported could be increased. However, memory is costly and a limited resource on a chip.

The example non-limiting technology provide better resource utilization and performance for ray tracing traversal workloads. Example embodiments, utilize significant storage compression based on ray traversal outcomes. The storage compression allows for the hardware resources, which would normally store the result data until the results are returned to a multiprocessor, to be released early. The early release of the resources allows the resources to be assigned to other queries waiting to be scheduled for processing.

The example non-limiting technology provides hardware-based capabilities that efficiently accelerate ray intersection testing.

Building a Bounding Volume Hierarchy for More Efficient Intersection Testing

As explained above, ray-object intersection testing is made more efficient through use of an acceleration data structure. As described above, an acceleration data structure comprises a hierarchy of bounding volumes (bounding volume hierarchy or BVH) that recursively encapsulates smaller and smaller bounding volume subdivisions. The largest volumetric bounding volume may be termed a "root node." The smallest subdivisions of such hierarchy of bounding volumes ("leaf nodes") contain items. The items could be primitives (e.g., polygons such as triangles) that define surfaces of the object. Or, an item could be a sphere that contains a whole new level of the world that exists as an item because it has not been added to the BVH (think of the collar charm on the cat from "Men in Black" which contained an entire miniature galaxy inside of it). If the item comprises primitives, the traversal co-processor upon reaching an intersecting leaf node tests rays against the primitives associated with the leaf node to determine which object surfaces the rays intersect and which object surfaces are visible along the ray.

Building a BVH can occur in two parts: static and dynamic. In many applications, a complex scene is preprocessed and the BVH is created based on static geometry of the scene. Then, using interactive graphics generation including dynamically created and manipulated moving objects, another part of the BVH (or an additional, linked BVH(es) can be built in real time (e.g., in each frame) by driver or other software running on the real time interactive graphics system. BVH construction need not be hardware accelerated (although it may be in some non-limiting embodiments) but may implemented using highly-optimized software routines running on SMs 132 and/or CPU 120 and/or other development systems e.g., during development of an application.

Figure 2:
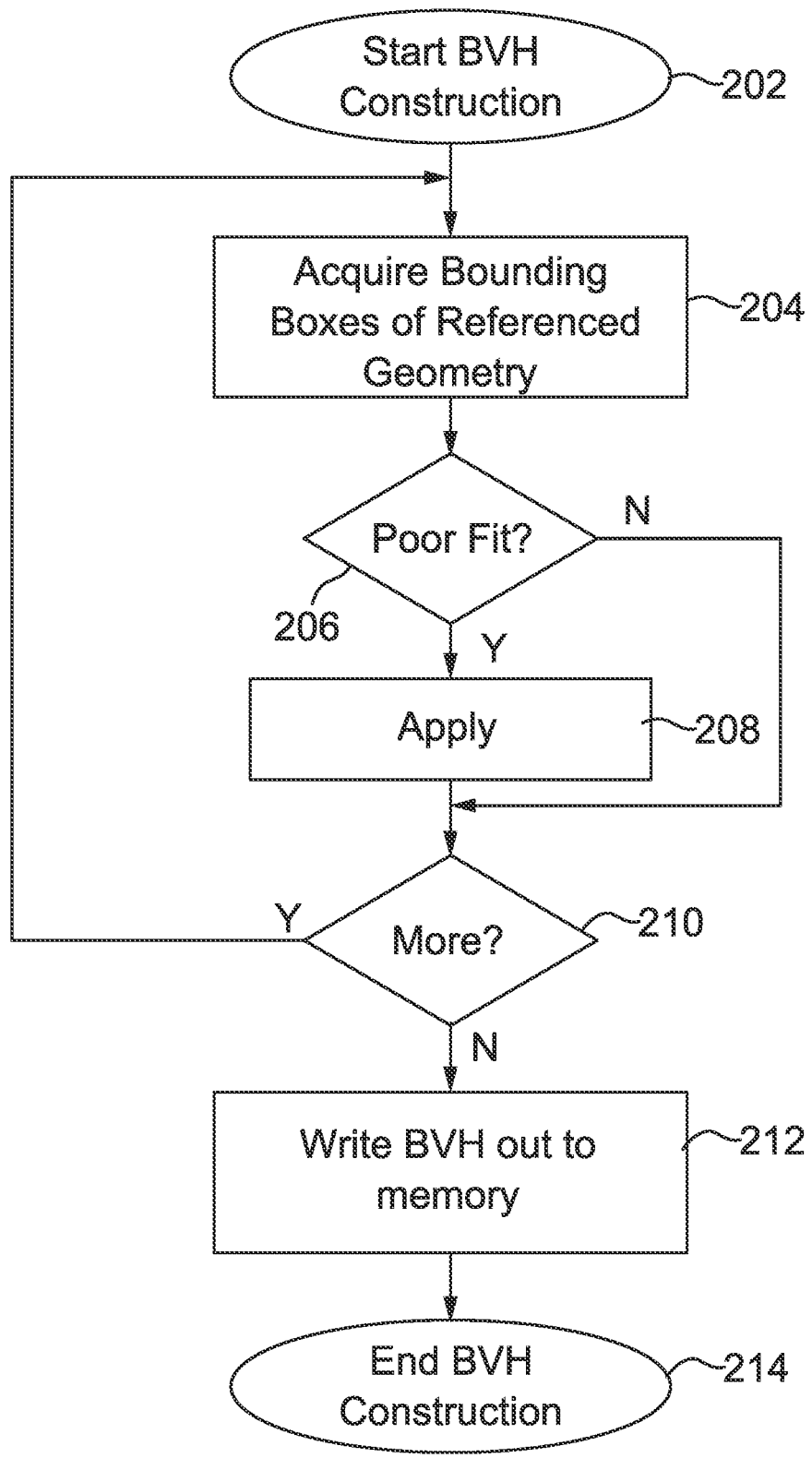
FIG. 2 shows an example process for constructing a suitable bounding volume hierarchy.

The first stage in BVH acceleration structure construction acquires the bounding boxes of the referenced geometry (FIG. 2, 204). This is achieved by executing for each geometric primitive in an object a bounding box procedure that returns a conservative axis-aligned bounding box (AABB) for its input primitive. Aligning bounding boxes with the axes of the relevant coordinate systems for the geometry provides for increased efficiency of real time geometrical operations such as intersection testing and coordinate transforms as compared for example to oriented bounding boxes (OBB's), bounding spheres, or other approaches. However, those skilled in the art will understand that the example non-limiting approaches herein can also be applied to more expensive bounding constructs such as OBBs, bounding spheres and other bounding volume technology.

Already subdivided bounding volumes that do include at least one portion of the geometry in a scene can be still further recursively subdivided—like the emergence of each of a succession of littler and littler cats from the hats of Dr. Seuss's' The Cat In The Hat Comes Back (1958). The number and configurations of recursive subdivisions will depend on the complexity and configuration of the 3D object being modeled as well as other factors such as desired resolution, distance of the object from the viewpoint, etc. One example subdivision scheme is a so-called 8-ary subdivision or "octree" in which each volume is subdivided into eight smaller volumes of uniform size, but many other spatial hierarchies and subdivision schemes are known such as a binary tree, a four-ary tree, a k-d tree, a binary space partitioning (BSP) tree, and a bounding volume hierarchy (BVH) tree. See e.g., U.S. Pat. No. 9,582,607.

At some level of subdivision (which can be different levels for different parts of the BVH), the BVH construction process encounters geometry making up the encapsulated object being modeled. Using the analogy of a tree, the successive volumetric subdivisions are the trunk, branches, boughs and twigs, and the geometric is finally revealed at the very tips of the tree, namely the leaves. At this point, the BVH construction process for example non-limiting embodiments herein performs an optimization at this stage to spot, using heuristic or other analytical techniques (which might include artificial intelligence and/or neural networks in some embodiments), those leaf nodes that present poor fits with respect to the geometry they contain (FIG. 2, 206).

This process continues until all bounding volumes containing geometry have been sufficiently subdivided to provide a reasonable number of geometric primitives per bounding box (FIG. 2, 210). The real time ray tracer that uses the BVH will determining ray-primitive intersections by comparing the spatial xyz coordinates of the vertices of each primitive with the xyz coordinates of the ray to determine whether the ray and the surface the primitive defines occupy the same space. The ray-primitive intersection test can be computationally intensive because there may be many triangles to test. In many cases, it may be more efficient to further volumetrically subdivide and thereby limit the number of primitives in any "leaf node" to something like 16 or fewer.

The resulting compressed tree comprising compressed treelets is written out into a data structure in memory for later use by the graphics processing hardware/software during e.g., real time graphics processing that includes real time ray tracing (FIG. 2, 212).

Figure 3B:
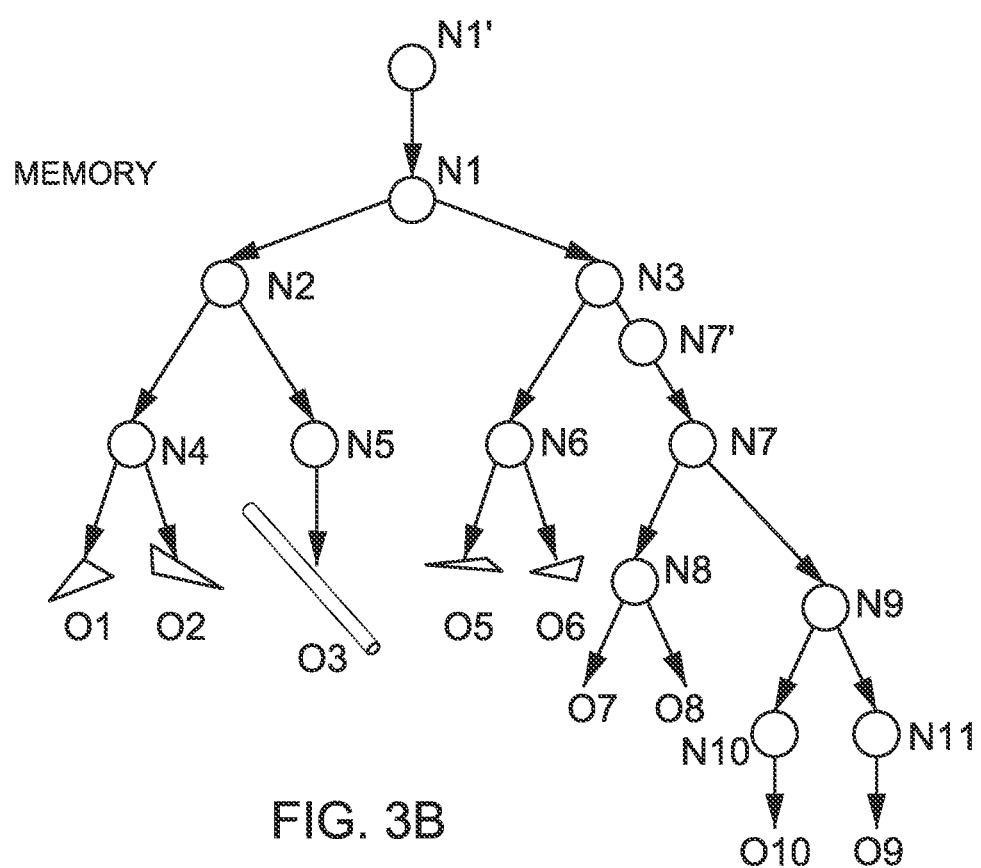

FIGS. 3A and 3B show a recursively-subdivided bounding volume of a 3D scene (FIG. 3A) and a corresponding tree data structure (FIG. 3B) that may be accessed by the ray tracer and used for hardware-accelerated operations. The tree data structure may be stored in memory and retrieved on demand based on queries.

The division of the bounding volumes may be represented in a hierarchical tree data structure with the large bounding volume represented by a parent node of the tree and the smaller bounding volumes represented by children nodes of the tree that are contained by the parent node. The smallest bounding volumes are represented as leaf nodes in the tree and identify one or more geometric primitives contained within these smallest bounding volumes.

The tree data structure includes a plurality of nodes arranged in a hierarchy. The root nodes N1 of the tree structure correspond to bounding volume N1 enclosing all of the primitives O1-O8. The root node N1 may identify the vertices of the bounding volume N1 and children nodes of the root node.

In FIG. 3A, bounding volume N1 is subdivided into bounding volumes N2 and N3. Children nodes N2 and N3 of the tree structure of FIG. 3B correspond to and represent the bounding volumes N2 and N3 shown in FIG. 3A. The children nodes N2 and N3 in the tree data structure identify the vertices of respective bounding volumes N2 and N3 in space. Each of the bounding volumes N2 and N3 is further subdivided in this particular example. Bounding volume N2 is subdivided into contained bounding volumes N4 and N5. Bounding volume N3 is subdivided into contained bounding volumes N6 and N7. Bounding volume N7 include two bounding volumes N8 and N9. Bounding volume N8 includes the triangles O7 and O8, and bounding volume N9 includes leaf bounding volumes N10 and N11 as its child bounding volumes. Leaf bounding volume N10 includes a primitive range (e.g., triangle range) O10 and leaf bounding volume N11 includes an item range O9. Respective children nodes N4, N5, N6, N8, N10 and N11 of the FIG. 3B tree structure correspond to and represent the FIG. 3A bounding volumes N4, N5, N6, N8, N10 and N11 in space.

The FIG. 3B tree in this particular example is only three to six levels deep so that volumes N4, N5, N6, N8, N10 and N11 constitute "leaf nodes"—that is, nodes in the tree that have no child nodes. FIG. 3A shows that leaf node bounding volumes N4, N6, and N8 each contains two triangles of the geometry in the scene. For example, volumetric subdivision N4 contains triangles O1 & O2; volumetric subdivision N6 contains trials O5 & O6; and volumetric subdivision N8 contains triangles O7 & O8. FIG. 3A further shows that leaf node bounding volume N5 contains a single cylinder O3 that does not provide a good fit for the AABB bounding volume N5 shown in dotted lines. Accordingly, in an example non-limiting embodiment herein, instead of using the larger AABB bounding volume N5 for the ray-bounding volume intersection test, TTU 138 instead tests the ray against a plurality of smaller AABB bounding volumes that are arranged, positioned, dimensioned and oriented to more closely fit cylinder O3.

The tree structure shown in FIG. 3B represents these leaf nodes N4, N5, N6, and N7 by associating them with the appropriate ones of primitive O1-O8 of the scene geometry. To access this scene geometry, the TTU 138 traverses the tree data structure of FIG. 3B down to the leaf nodes. In general, different parts of the tree can and will have different depths and contain different numbers of primitives. Leaf nodes associated with volumetric subdivisions that contain no geometry need not be explicitly represented in the tree data structure (i.e., the tree is "trimmed").

According to some embodiments, the subtree rooted at N7 may represent a set of bounding volumes or BVH that is defined in a different coordinate space than the bounding volumes corresponding to nodes N1-N3. When bounding volume N7 is in a different coordinate space from its parent bounding volume N3, an instance node N7' which provides the ray transformation necessary to traverse the subtree rooted at N7, may connect the rest of the tree to the subtree rooted at N7. Instance node N7' connects the bounding volume or BVH corresponding to nodes N1-N3, with the bounding volumes or BVH corresponding to nodes N7 etc. by defining the transformation from the coordinate space of N1-N3 (e.g., world space) to the coordinate space of N7 etc. (e.g., object space).

The acceleration structure constructed as described above can be used to advantage by software based graphics pipeline processes running on a conventional general purpose computer. However, the presently disclosed non-limiting embodiments advantageously implement the above-described techniques in the context of a hardware-based graphics processing unit including a high performance processors such as one or more streaming multiprocessors ("SMs") and one or more traversal co-processors or "tree traversal units" ("TTUs")—subunits of one or a group of streaming multiprocessor SMs of a 3D graphics processing pipeline. The following describes the overall structure and operation of such as system including a TTU 138 that accelerates certain processes supporting interactive ray tracing including ray-bounding volume intersection tests, ray-primitive intersection tests and ray "instance" transforms for real time ray tracing and other applications.

Example System Block Diagram

Figure 4:
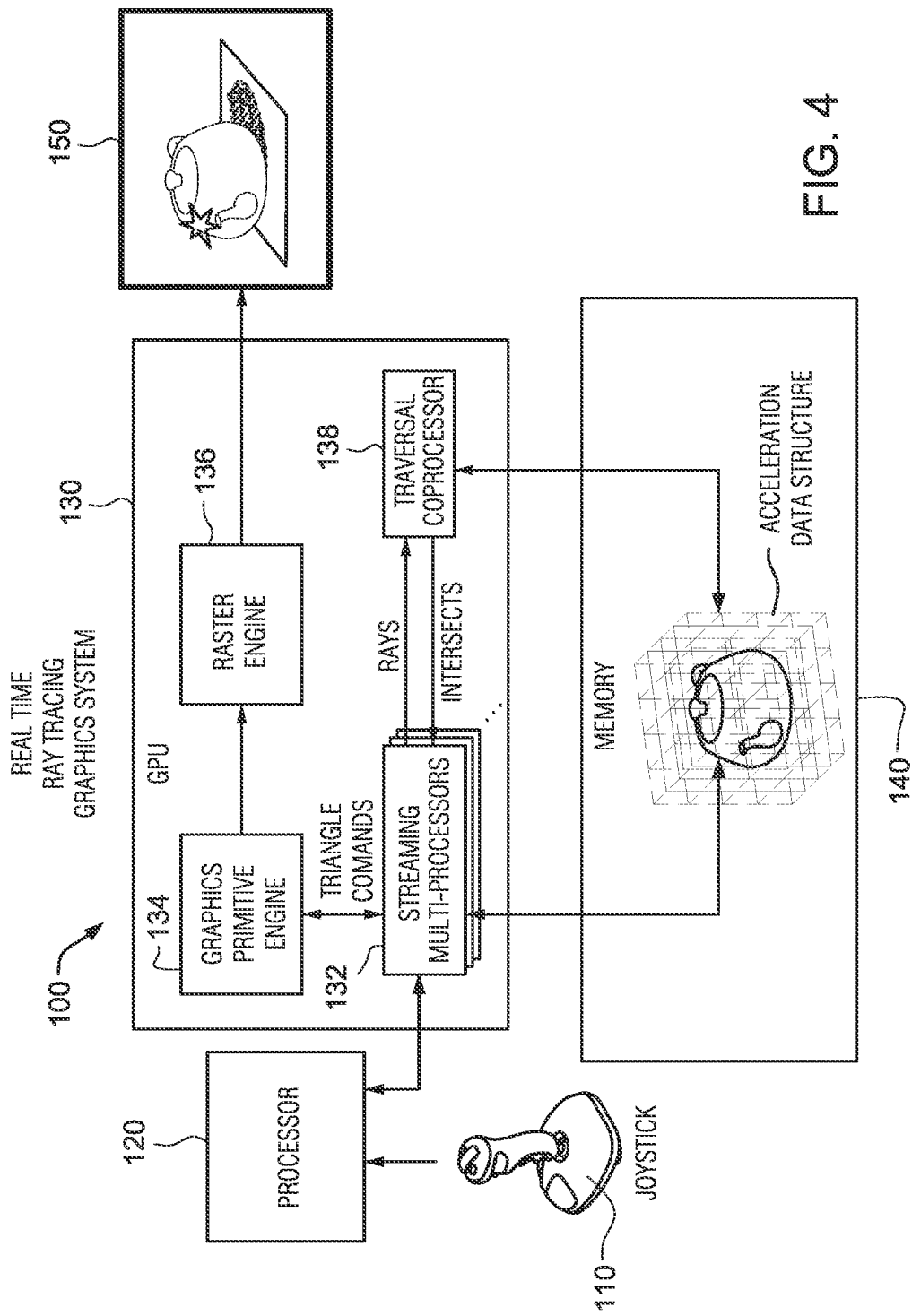
FIG. 4 illustrates an example non-limiting ray tracing graphics system.

FIG. 4 illustrates an example real time ray interactive tracing graphics system 100 for generating images using three dimensional (3D) data of a scene or object(s) including the acceleration data structure constructed as described above.

System 100 includes an input device 110, a processor(s) 120, a graphics processing unit(s) (GPU(s)) 130, memory 140, and a display(s) 150. The system shown in FIG. 4 can take on any form factor including but not limited to a personal computer, a smart phone or other smart device, a video game system, a wearable virtual or augmented reality system, a cloud-based computing system, a vehicle-mounted graphics system, a system-on-a-chip (SoC), etc.

The processor 120 may be a multicore central processing unit (CPU) operable to execute an application in real time interactive response to input device 110, the output of which includes images for display on display 150. Display 150 may be any kind of display such as a stationary display, a head mounted display such as display glasses or goggles, other types of wearable displays, a handheld display, a vehicle mounted display, etc. For example, the processor 120 may execute an application based on inputs received from the input device 110 (e.g., a joystick, an inertial sensor, an ambient light sensor, etc.) and instruct the GPU 130 to generate images showing application progress for display on the display 150.

Based on execution of the application on processor 120, the processor may issue instructions for the GPU 130 to generate images using 3D data stored in memory 140. The GPU 130 includes specialized hardware for accelerating the generation of images in real time. For example, the GPU 130 is able to process information for thousands or millions of graphics primitives (polygons) in real time due to the GPU's ability to perform repetitive and highly-parallel specialized computing tasks such as polygon scan conversion much faster than conventional software-driven CPUs. For example, unlike the processor 120, which may have multiple cores with lots of cache memory that can handle a few software threads at a time, the GPU 130 may include hundreds or thousands of processing cores or "streaming multiprocessors" (SMs) 132 running in parallel.

In one example embodiment, the GPU 130 includes a plurality of programmable high performance processors that can be referred to as "streaming multiprocessors" ("SMs") 132, and a hardware-based graphics pipeline including a graphics primitive engine 134 and a raster engine 136. These components of the GPU 130 are configured to perform real-time image rendering using a technique called "scan conversion rasterization" to display three-dimensional scenes on a two-dimensional display 150. In rasterization, geometric building blocks (e.g., points, lines, triangles, quads, meshes, etc.) of a 3D scene are mapped to pixels of the display (often via a frame buffer memory).

The GPU 130 converts the geometric building blocks (i.e., polygon primitives such as triangles) of the 3D model into pixels of the 2D image and assigns an initial color value for each pixel. The graphics pipeline may apply shading, transparency, texture and/or color effects to portions of the image by defining or adjusting the color values of the pixels. The final pixel values may be anti-aliased, filtered and provided to the display 150 for display. Many software and hardware advances over the years have improved subjective image quality using rasterization techniques at frame rates needed for real-time graphics (i.e., 30 to 60 frames per second) at high display resolutions such as 4096×2160 pixels or more on one or multiple displays 150.

To enable the GPU 130 to perform ray tracing in real time in an efficient manner, the GPU provides one or more "TTUs" 138 coupled to one or more SMs 132. The TTU 138 includes hardware components configured to perform (or accelerate) operations commonly utilized in ray tracing algorithms. A goal of the TTU 138 is to accelerate operations used in ray tracing to such an extent that it brings the power of ray tracing to real-time graphics application (e.g., games), enabling high-quality shadows, reflections, and global illumination. Results produced by the TTU 138 may be used together with or as an alternative to other graphics related operations performed in the GPU 130.

More specifically, SMs 132 and the TTU 138 may cooperate to cast rays into a 3D model and determine whether and where that ray intersects the model's geometry. Ray tracing directly simulates light traveling through a virtual environment or scene. The results of the ray intersections together with surface texture, viewing direction, and/or lighting conditions are used to determine pixel color values. Ray tracing performed by SMs 132 working with TTU 138 allows for computer-generated images to capture shadows, reflections, and refractions in ways that can be indistinguishable from photographs or video of the real world. Since ray tracing techniques are even more computationally intensive than rasterization due in part to the large number of rays that need to be traced, the TTU 138 is capable of accelerating in hardware certain of the more computationally-intensive aspects of that process.

Given a BVH constructed as described above, the TTU 138 performs a tree search where each node in the tree visited by the ray has a bounding volume for each descendent branch or leaf, and the ray only visits the descendent branches or leaves whose corresponding bound volume it intersects. In this way, TTU 138 explicitly tests only a small number of primitives for intersection, namely those that reside in leaf nodes intersected by the ray. In the example non-limiting embodiments, the TTU 138 accelerates both tree traversal (including the ray-volume tests) and ray-primitive tests. As part of traversal, it can also handle at least one level of instance transforms, transforming a ray from world-space coordinates into the coordinate system of an instanced mesh. In the example non-limiting embodiments, the TTU 138 does all of this in MIMD fashion, meaning that rays are handled independently once inside the TTU.

In the example non-limiting embodiments, the TTU 138 operates as a servant (coprocessor) to the SMs (streaming multiprocessors) 132. In other words, the TTU 138 in example non-limiting embodiments does not operate independently, but instead follows the commands of the SMs 132 to perform certain computationally-intensive ray tracing related tasks much more efficiently than the SMs 132 could perform themselves. In other embodiments or architectures, the TTU 138 could have more or less autonomy.

In the examples shown, the TTU 138 receives commands via SM 132 instructions and writes results back to an SM register file. For many common use cases (e.g., opaque triangles with at most one level of instancing), the TTU 138 can service the ray tracing query without further interaction with the SM 132. More complicated queries (e.g., involving alpha-tested triangles, primitives other than triangles, or multiple levels of instancing) may require multiple round trips (although the technology herein reduces the need for such "round trips" for certain kinds of geometry by providing the TTU 138 with enhanced capabilities to autonomously perform ray-bounding-volume intersection testing without the need to ask the calling SM for help). In addition to tracing rays, the TTU 138 is capable of performing more general spatial queries where an AABB or the extruded volume between two AABBs (which we call a "beam") takes the place of the ray. Thus, while the TTU 138 is especially adapted to accelerate ray tracing related tasks, it can also be used to perform tasks other than ray tracing.

The TTU 138 thus autonomously performs a test of each ray against a wide range of bounding volumes, and can cull any bounding volumes that don't intersect with that ray. Starting at a root node that bounds everything in the scene, the traversal co-processor tests each ray against smaller (potentially overlapping) child bounding volumes which in turn bound the descendent branches of the BVH. The ray follows the child pointers for the bounding volumes the ray hits to other nodes until the leaves or terminal nodes (volumes) of the BVH are reached.

Once the TTU 138 traverses the acceleration data structure to reach a terminal or "leaf" node (which may be represented by one or multiple bounding volumes) that intersects the ray and contains a geometric primitive, it performs an accelerated ray-primitive intersection test to determine whether the ray intersects that primitive (and thus the object surface that primitive defines). The ray-primitive test can provide additional information about primitives the ray intersects that can be used to determine the material properties of the surface required for shading and visualization. Recursive traversal through the acceleration data structure enables the traversal co-processor to discover all object primitives the ray intersects, or the closest (from the perspective of the viewpoint) primitive the ray intersects (which in some cases is the only primitive that is visible from the viewpoint along the ray). See e.g., Lefrancois et al, NVIDIA Vulkan Ray Tracing Tutorial, December 2019, https://developer.nvidia.com/rtx/raytracing/vkray As mentioned above, the TTU 138 also accelerates the transform of each ray from world space into object space to obtain finer and finer bounding box encapsulations of the primitives and reduce the duplication of those primitives across the scene. As described above, objects replicated many times in the scene at different positions, orientations and scales can be represented in the scene as instance nodes which associate a bounding box and leaf node in the world space BVH with a transformation that can be applied to the world-space ray to transform it into an object coordinate space, and a pointer to an object-space BVH. This avoids replicating the object space BVH data multiple times in world space, saving memory and associated memory accesses. The instance transform increases efficiency by transforming the ray into object space instead of requiring the geometry or the bounding volume hierarchy to be transformed into world (ray) space and is also compatible with additional, conventional rasterization processes that graphics processing performs to visualize the primitives.

Example Ray Tracing Processes

Figure 5:
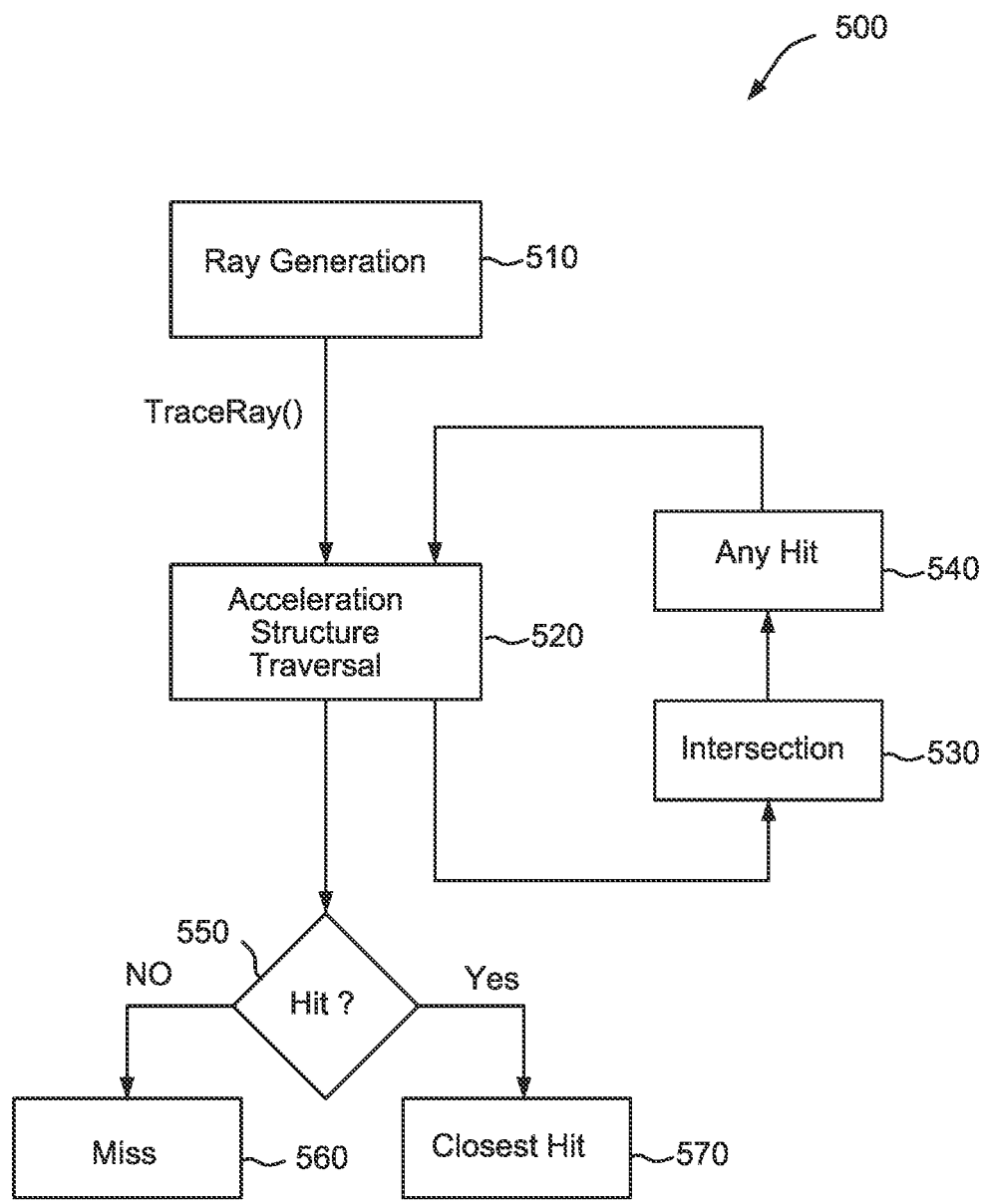
FIG. 5 is a flowchart of an example non-limiting ray tracing graphics pipeline.

FIG. 5 shows an exemplary ray tracing shading pipeline 500 that may be performed by SM 132 and accelerated by TTU 138. The ray tracing shading pipeline 500 starts by an SM 132 invoking ray generation 510 and issuing a corresponding ray tracing request to the TTU 138. The ray tracing request identifies a single ray cast into the scene and asks the TTU 138 to search for intersections with an acceleration data structure the SM 132 also specifies. The TTU 138 traverses (FIG. 5 block 520) the acceleration data structure to determine intersections or potential intersections between the ray and the volumetric subdivisions and associated triangles the acceleration data structure represents. Potential intersections can be identified by finding bounding volumes in the acceleration data structure that are intersected by the ray. Descendants of non-intersected bounding volumes need not be examined.

For triangles within intersected bounding volumes, a TTU 138 ray-primitive test block 720 performs an intersection 530 process to determine whether the ray intersects the primitives.

The SM 132 can for example instruct the TTU 138 to report only the "closest hit" intersection of the ray with the specified geometry, or it may instruct the TTU 138 also to report "any hit" intersections of the ray with the specified geometry, regardless of order. In the latter case, mid-traversal the TTU 138 may return intersection information to the SM 132, which may perform an "any hit" shading operation 540 in response to determine if an actual intersection has occurred. For example, the SM 132 may perform (or have other hardware perform) a texture lookup for an intersected primitive and decide based on the appropriate texel's value whether an actual hit occurred or the opacity of a translucent material and may complete traversal or resume traversal (if the ray was returned with a non-empty stack) on the TTU 138 as a function of the "any hit" shaded value. The SM 132 optionally keeps track of such results since the TTU 138 may return multiple intersections with different geometry in the scene in arbitrary order and translucent materials must be composited in order.

When traversal is complete, the TTU 138 returns the results of the query to the SM 132. For rays which intersected a primitive, the TTU 138 returns information about the intersected primitive, for example, in the case of an intersected triangle, a triangle_id, and barycentric coordinates which SM 132 can use to identify and invoke a "closest hit" shading function 570. For rays which intersected no primitives, the SM 132 returns an identifier which indicates that nothing was hit so that the SM 132 can perform a "miss" shading operation invoking a previously designated miss shader 560.

Figure 6:
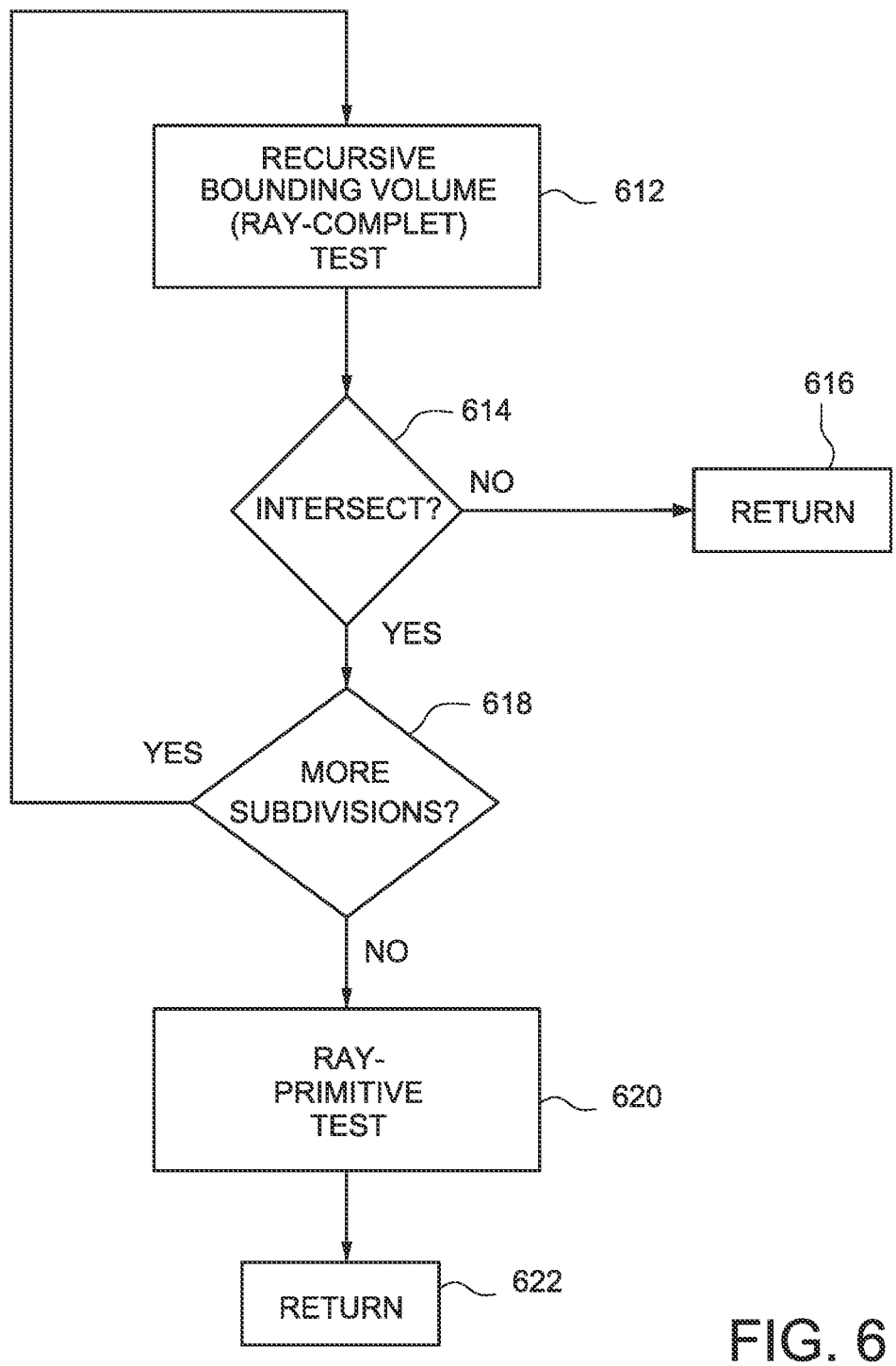
FIG. 6 is a flowchart of example non-limiting hardware based ray tracing operations.

FIG. 6 is a flowchart summarizing example ray tracing operations the TTU 138 performs as described above in cooperation with SM(s) 132. The FIG. 6 operations are performed by TTU 138 in cooperation with its interaction with an SM 132. The TTU 138 may thus receive the identification of a ray from the SM 132 and traversal state enumerating one or more nodes in one or more BVH's that the ray must traverse. The TTU 138 determines which bounding volumes of a BVH data structure the ray intersects (the "ray-complet" test 612). The TTU 138 can also subsequently determine whether the ray intersects one or more primitives in the intersected bounding volumes and which triangles are intersected (the "ray-primitive test" 620)—or the SM 132 can perform this test in software if it is too complicated for the TTU to perform itself. In example non-limiting embodiments, complets specify root or interior nodes (i.e., volumes) of the bounding volume hierarchy with children that are other complets or leaf nodes of a single type per complet.

First, the TTU 138 inspects the traversal state of the ray. If a stack the TTU 138 maintains for the ray is empty, then traversal is complete. If there is an entry on the top of the stack, the traversal co-processor 138 issues a request to the memory subsystem to retrieve that node. The traversal co-processor 138 then performs a bounding box test 612 to determine if a bounding volume of a BVH data structure is intersected by a particular ray the SM 132 specifies (step 612, 614). If the bounding box test determines that the bounding volume is not intersected by the ray ("No" in step 614), then there is no need to perform any further testing for visualization and the TTU 138 can return this result to the requesting SM 132. This is because if a ray misses a bounding volume (as in FIG. 1A with respect to bounding volume 10), then the ray will miss all other smaller bounding volumes inside the bounding volume being tested and any primitives that bounding volume contains.

If the bounding box test performed by the TTU 138 reveals that the bounding volume is intersected by the ray ("Yes" in Step 614), then the TTU determines if the bounding volume can be subdivided into smaller bounding volumes (step 618). In one example embodiment, the TTU 138 isn't necessarily performing any subdivision itself. Rather, each node in the BVH has one or more children (where each child is a leaf or a branch in the BVH). For each child, there is one or more bounding volumes and a pointer that leads to a branch or a leaf node. When a ray processes a node using TTU 138, it is testing itself against the bounding volumes of the node's children. The ray only pushes stack entries onto its stack for those branches or leaves whose representative bounding volumes were hit. When a ray fetches a node in the example embodiment, it doesn't test against the bounding volume of the node—it tests against the bounding volumes of the node's children. The TTU 138 pushes nodes whose bounding volumes are hit by a ray onto the ray's traversal stack in an order determined by ray configuration. For example, it is possible to push nodes onto the traversal stack in the order the nodes appear in memory, or in the order that they appear along the length of the ray, or in some other order. If there are further subdivisions of the bounding volume ("Yes" in step 618), then those further subdivisions of the bounding volume are accessed and the bounding box test is performed for each of the resulting subdivided bounding volumes to determine which subdivided bounding volumes are intersected by the ray and which are not. In this recursive process, some of the bounding volumes may be eliminated by test 614 while other bounding volumes may result in still further and further subdivisions being tested for intersection by TTU 138 recursively applying steps 612-618.

Once the TTU 138 determines that the bounding volumes intersected by the ray are leaf nodes ("No" in step 518), the TTU 138 and/or SM 132 performs a primitive (e.g., triangle) intersection test 620 to determine whether the ray intersects primitives in the intersected bounding volumes and which primitives the ray intersects. The TTU 138 thus performs a depth-first traversal of intersected descendent branch nodes until leaf nodes are reached. The TTU 138 processes the leaf nodes. If the leaf nodes are primitive ranges, the TTU 138 or the SM 132 tests them against the ray. If the leaf nodes are instance nodes, the TTU 138 or the SM 132 applies the instance transform. If the leaf nodes are item ranges, the TTU 138 returns them to the requesting SM 132. In the example non-limiting embodiments, the SM 132 can command the TTU 138 to perform different kinds of ray-primitive intersection tests and report different results depending on the operations coming from an application (or an software stack the application is running on) and relayed by the SM to the TTU. For example, the SM 132 can command the TTU 138 to report the nearest visible primitive revealed by the intersection test, or to report all primitives the ray intersects irrespective of whether they are the nearest visible primitive. The SM 132 can use these different results for different kinds of visualization. Or the SM 132 can perform the ray-primitive intersection test itself once the TTU 138 has reported the ray-complet test results. Once the TTU 138 is done processing the leaf nodes, there may be other branch nodes (pushed earlier onto the ray's stack) to test.

Example Non-Limiting TTU 138 Hardware Implementation

FIG. 7 shows an example simplified block diagram of TTU 138 including hardware configured to perform accelerated traversal operations as described above. In some embodiments, the TTU 138 may perform a depth-first traversal of a bounding volume hierarchy using a short stack traversal with intersection testing of supported leaf node primitives and mid-traversal return of alpha primitives and unsupported leaf node primitives (items). The TTU 138 includes dedicated hardware to determine whether a ray intersects bounding volumes and dedicated hardware to determine whether a ray intersects primitives of the tree data structure.

The TTU 138 may include an interface 160 between the SM 132 and the TTU execution units. The interface 160 enables the SM 132 to efficiently and robustly run acceleration structure traversals on the TTU 138 by scheduling received queries and returning query results such that the execution units in the TTU 138 are efficiently provided with data for processing. In some examples, the interface 160 or one or more components of the interface 160 may be provided external to the TTU 138.

In more detail, TTU 138 includes an intersection management block 722, a ray management block 730 and a stack management block 740. Each of these blocks (and all of the other blocks in FIG. 7) may constitute dedicated hardware implemented by logic gates, registers, hardware-embedded lookup tables or other combinatorial logic, etc.

The ray management block 730 is responsible for managing information about and performing operations concerning a ray specified by an SM 132 to the ray management block. The stack management block 740 works in conjunction with traversal logic 712 to manage information about and perform operations related to traversal of a BVH acceleration data structure. Traversal logic 712 is directed by results of a ray-complet test block 710 that tests intersections between the ray indicated by the ray management block 730 and volumetric subdivisions represented by the BVH, using instance transforms as needed. The ray-complet test block 710 retrieves additional information concerning the BVH from memory 140 via an L0 complet cache 752 that is part of the TTU 138. The results of the ray-complet test block 710 informs the traversal logic 712 as to whether further recursive traversals are needed. The stack management block 740 maintains stacks to keep track of state information as the traversal logic 712 traverses from one level of the BVH to another, with the stack management block 740 pushing items onto the stack as the traversal logic traverses deeper into the BVH and popping items from the stack as the traversal logic traverses upwards in the BVH. The stack management block 740 is able to provide state information (e.g., intermediate or final results) to the requesting SM 132 at any time the SM requests.

The intersection management block 722 manages information about and performs operations concerning intersections between rays and primitives, using instance transforms as needed. The ray-primitive test block 720 retrieves information concerning geometry from memory 140 on an as-needed basis via an L0 primitive cache 754 that is part of TTU 138. The intersection management block 722 is informed by results of intersection tests the ray-primitive test and transform block 720 performs. Thus, the ray-primitive test and transform block 720 provides intersection results to the intersection management block 722, which reports geometry hits and intersections to the requesting SM 132.

A Stack Management Unit 740 inspects the traversal state to determine what type of data needs to be retrieved and which data path (complet or primitive) will consume it. The intersections for the bounding volumes are determined in the ray-complet test path of the TTU 138 including one or more ray-complet test blocks 710 and one or more traversal logic blocks 712. A complet specifies root or interior nodes of a bounding volume. Thus, a complet may define one or more bounding volumes for the ray-complet test. In example embodiments herein, a complet may define a plurality of "child" bounding volumes that (whether or not they represent leaf nodes) that don't necessarily each have descendants but which the TTU will test in parallel for ray-bounding volume intersection to determine whether geometric primitives associated with the plurality of bounding volumes need to be tested for intersection.

The ray-complet test path of the TTU 138 identifies which bounding volumes are intersected by the ray. Bounding volumes intersected by the ray need to be further processed to determine if the primitives associated with the intersected bounding volumes are intersected. The intersections for the primitives are determined in the ray-primitive test path including one or more ray-primitive test and transform blocks 720 and one or more intersection management blocks 722.

The TTU 138 receives queries from one or more SMs 132 to perform tree traversal operations. The query may request whether a ray intersects bounding volumes and/or primitives in a BVH data structure. The query may identify a ray (e.g., origin, direction, and length of the ray) and a BVH data structure and traversal state (short stack) which includes one or more entries referencing nodes in one or more Bounding Volume Hierarchies that the ray is to visit. The query may also include information for how the ray is to handle specific types of intersections during traversal. The ray information may be stored in the ray management block 730. The stored ray information (e.g., ray length) may be updated based on the results of the ray-primitive test.

The TTU 138 may request the BVH data structure identified in the query to be retrieved from memory outside of the TTU 138. Retrieved portions of the BVH data structure may be cached in the level-zero (L0) cache 750 within the TTU 138 so the information is available for other time-coherent TTU operations, thereby reducing memory 140 accesses. Portions of the BVH data structure needed for the ray-complet test may be stored in a L0 complet cache 752 and portions of the BVH data structure needed for the ray-primitive test may be stored in an L0 primitive cache 754.

After the complet information needed for a requested traversal step is available in the complet cache 752, the ray-complet test block 710 determines bounding volumes intersected by the ray. In performing this test, the ray may be transformed from the coordinate space of the bounding volume hierarchy to a coordinate space defined relative to a complet. The ray is tested against the bounding boxes associated with the child nodes of the complet. In the example non-limiting embodiment, the ray is not tested against the complet's own bounding box because (1) the TTU 138 previously tested the ray against a similar bounding box when it tested the parent bounding box child that referenced this complet, and (2) a purpose of the complet bounding box is to define a local coordinate system within which the child bounding boxes can be expressed in compressed form. If the ray intersects any of the child bounding boxes, the results are pushed to the traversal logic to determine the order that the corresponding child pointers will be pushed onto the traversal stack (further testing will likely require the traversal logic 712 to traverse down to the next level of the BVH). These steps are repeated recursively until intersected leaf nodes of the BVH are encountered The ray-complet test block 710 may provide ray-complet intersections to the traversal logic 712. Using the results of the ray-complet test, the traversal logic 712 creates stack entries to be pushed to the stack management block 740. The stack entries may indicate internal nodes (i.e., a node that includes one or more child nodes) that need to be further tested for ray intersections by the ray-complet test block 710 and/or triangles identified in an intersected leaf node that need to be tested for ray intersections by the ray-primitive test and transform block 720. The ray-complet test block 710 may repeat the traversal on internal nodes identified in the stack to determine all leaf nodes in the BVH that the ray intersects. The precise tests the ray-complet test block 710 performs will in the example non-limiting embodiment be determined by mode bits, ray operations (see below) and culling of hits, and the TTU 138 may return intermediate as well as final results to the SM 132.

Ray-Primitive Intersection Testing

Referring again to FIG. 7, the TTU 138 also has the ability to accelerate intersection tests that determine whether a ray intersects particular geometry or primitives. For some cases, the geometry is sufficiently complex (e.g., defined by curves or other abstract constructs as opposed to e.g., vertices) that TTU 138 in some embodiments may not be able to help with the ray-primitive intersection testing. In such cases, the TTU 138 simply reports the ray-complet intersection test results to the SM 132, and the SM 132 performs the ray-primitive intersection test itself. In other cases (e.g., triangles), the TTU 138 can perform the ray-triangle intersection test itself, thereby further increasing performance of the overall ray tracing process. For sake of completeness, the following describes how the TTU 138 can perform or accelerate the ray-primitive intersection testing.

As explained above, leaf nodes found to be intersected by the ray identify (enclose) primitives that may or may not be intersected by the ray. One option is for the TTU 138 to provide e.g., a range of geometry identified in the intersected leaf nodes to the SM 132 for further processing. For example, the SM 132 may itself determine whether the identified primitives are intersected by the ray based on the information the TTU 138 provides as a result of the TTU traversing the BVH. To offload this processing from the SM 132 and thereby accelerate it using the hardware of the TTU 138, the stack management block 740 may issue requests for the ray-primitive and transform block 720 to perform a ray-primitive test for the primitives within intersected leaf nodes the TTU's ray-complet test block 710 identified. In some embodiments, the SM 132 may issue a request for the ray-primitive test to test a specific range of primitives and transform block 720 irrespective of how that geometry range was identified.

After making sure the primitive data needed for a requested ray-primitive test is available in the primitive cache 754, the ray-primitive and transform block 720 may determine primitives that are intersected by the ray using the ray information stored in the ray management block 730. The ray-primitive test block 720 provides the identification of primitives determined to be intersected by the ray to the intersection management block 722.

The intersection management block 722 can return the results of the ray-primitive test to the SM 132. The results of the ray-primitive test may include identifiers of intersected primitives, the distance of intersections from the ray origin and other information concerning properties of the intersected primitives. In some embodiments, the intersection management block 722 may modify an existing ray-primitive test (e.g., by modifying the length of the ray) based on previous intersection results from the ray-primitive and transform block 720.

The intersection management block 722 may also keep track of different types of primitives. For example, the different types of triangles include opaque triangles that will block a ray when intersected and alpha triangles that may or may not block the ray when intersected or may require additional handling by the SM. Whether a ray is blocked or not by a transparent triangle may for example depend on texture(s) mapped onto the triangle, area of the triangle occupied by the texture and the way the texture modifies the triangle. For example, transparency (e.g., stained glass) in some embodiments requires the SM 132 to keep track of transparent object hits so they can be sorted and shaded in ray-parametric order, and typically don't actually block the ray. Meanwhile, alpha "trimming" allows the shape of the primitive to be trimmed based on the shape of a texture mapped onto the primitive—for example, cutting a leaf shape out of a triangle. (Note that in raster graphics, transparency is often called "alpha blending" and trimming is called "alpha test"). In other embodiments, the TTU 138 can push transparent hits to queues in memory for later handling by the SM 132 and directly handle trimmed triangles by sending requests to the texture unit. Each triangle may include a designator to indicate the triangle type. The intersection management block 722 is configured to maintain a result queue for tracking the different types of intersected triangles. For example, the result queue may store one or more intersected opaque triangle identifiers in one queue and one or more transparent triangle identifiers in another queue.

For opaque triangles, the ray intersection for less complex geometry can be fully determined in the TTU 138 because the area of the opaque triangle blocks the ray from going past the surface of the triangle. For transparent triangles, ray intersections cannot in some embodiments be fully determined in the TTU 138 because TTU 138 performs the intersection test based on the geometry of the triangle and may not have access to the texture of the triangle and/or area of the triangle occupied by the texture (in other embodiments, the TTU may be provided with texture information by the texture mapping block of the graphics pipeline). To fully determine whether the triangle is intersected, information about transparent triangles the ray-primitive and transform block 720 determines are intersected may be sent to the SM 132, for the SM to make the full determination as to whether the triangle affects visibility along the ray.

The SM 132 can resolve whether or not the ray intersects a texture associated with the transparent triangle and/or whether the ray will be blocked by the texture. The SM 132 may in some cases send a modified query to the TTU 138 (e.g., shortening the ray if the ray is blocked by the texture) based on this determination. In one embodiment, the TTU 138 may be configured to return all triangles determined to intersect the ray to the SM 132 for further processing. Because returning every triangle intersection to the SM 132 for further processing is costly in terms of interface and thread synchronization, the TTU 138 may be configured to hide triangles which are intersected but are provably capable of being hidden without a functional impact on the resulting scene. For example, because the TTU 138 is provided with triangle type information (e.g., whether a triangle is opaque or transparent), the TTU 138 may use the triangle type information to determine intersected triangles that are occluded along the ray by another intersecting opaque triangle and which thus need not be included in the results because they will not affect the visibility along the ray. If the TTU 138 knows that a triangle is occluded along the ray by an opaque triangle, the occluded triangle can be hidden from the results without impact on visualization of the resulting scene.

The intersection management block 722 may include a result queue for storing hits that associate a triangle ID and information about the point where the ray hit the triangle. When a ray is determined to intersect an opaque triangle, the identity of the triangle and the distance of the intersection from the ray origin can be stored in the result queue. If the ray is determined to intersect another opaque triangle, the other intersected opaque triangle can be omitted from the result if the distance of the intersection from the ray origin is greater than the distance of the intersected opaque triangle already stored in the result queue. If the distance of the intersection from the ray origin is less than the distance of the intersected opaque triangle already stored in the result queue, the other intersected opaque triangle can replace the opaque triangle stored in the result queue. After all of the triangles of a query have been tested, the opaque triangle information stored in the result queue and the intersection information may be sent to the SM 132.

In some embodiments, once an opaque triangle intersection is identified, the intersection management block 722 may shorten the ray stored in the ray management block 730 so that bounding volumes (which may include triangles) behind the intersected opaque triangle (along the ray) will not be identified as intersecting the ray.

The intersection management block 722 may store information about intersected transparent triangles in a separate queue. The stored information about intersected transparent triangles may be sent to the SM 132 for the SM to resolve whether or not the ray intersects a texture associated with the triangle and/or whether the texture blocks the ray. The SM may return the results of this determination to the TTU 138 and/or modify the query (e.g., shorten the ray if the ray is blocked by the texture) based on this determination.

As discussed above, the TTU 138 allows for quick traversal of an acceleration data structure (e.g., a BVH) to determine which primitives (e.g., triangles used for generating a scene) in the data structure are intersected by a query data structure (e.g., a ray). For example, the TTU 138 may determine which triangles in the acceleration data structure are intersected by the ray and return the results to the SM 132. However, returning to the SM 132 a result on every triangle intersection is costly in terms of interface and thread synchronization. The TTU 138 provides a hardware logic configured to hide those items or triangles which are provably capable of being hidden without a functional impact on the resulting scene. The reduction in returns of results to the SM and synchronization steps between threads greatly improves the overall performance of traversal. The example non-limiting embodiments of the TTU 138 disclosed in this application provides for some of the intersections to be discarded within the TTU 138 without SM 132 intervention so that less intersections are returned to the SM 132 and the SM 132 does not have to inspect all intersected triangles or item ranges.

Early Release of TTU Resources

As discussed above, the TTU 138 processes ray visibility queries issued by the SM 132. The TTU 138 performs ray visibility queries on behalf of a warp. Each warp includes a group of threads (e.g., 32 threads in a warp), each of which can launch an independent ray query. In the TTU 138, the warp is assigned a ticket and each thread is assigned resources across the TTU 138. The TTU 138 resources may include execution slots (referred to as ray slots which may be memory or registers) for storing intermediate and/or final test results. A ray slot may include components spread out across different processing units of the TTU 138. The TTU 138 is free to operate on the assigned resources in any order. The return of results to the SM 132 is synchronized for a ticket.

A performance problem comes in that ray queries can vary greatly in complexity with some being short and others taking a much longer time to complete. For example, one ray query may take longer to complete because the data needed for the query needs to be retrieved from memory outside of the TTU 138 while data needed for another query is located in the level-zero (L0) cache 750 within the TTU 138. In another example, the number of primitives that need to be tested and retrieved in each query may be different. In other examples, the parameters set for the ray defining what test results should be returned will affect the time it takes for the query to complete.

Since the results for tickets are returned in groups, any short traversals within a ticket have to wait for the longest traversals to finish. While waiting, those rays are consuming TTU 138 storage resources (e.g., ray slots) which are then not used for active traversal. Performance can be improved if the number of ray slots is increased, but ray slots are an expensive resource in the TTU 138 because of the area they take up on a chip. Accordingly, there is a need to minimize the number of ray slots in the TTU while efficiently utilizing the available ray slots.

Figure 8A:
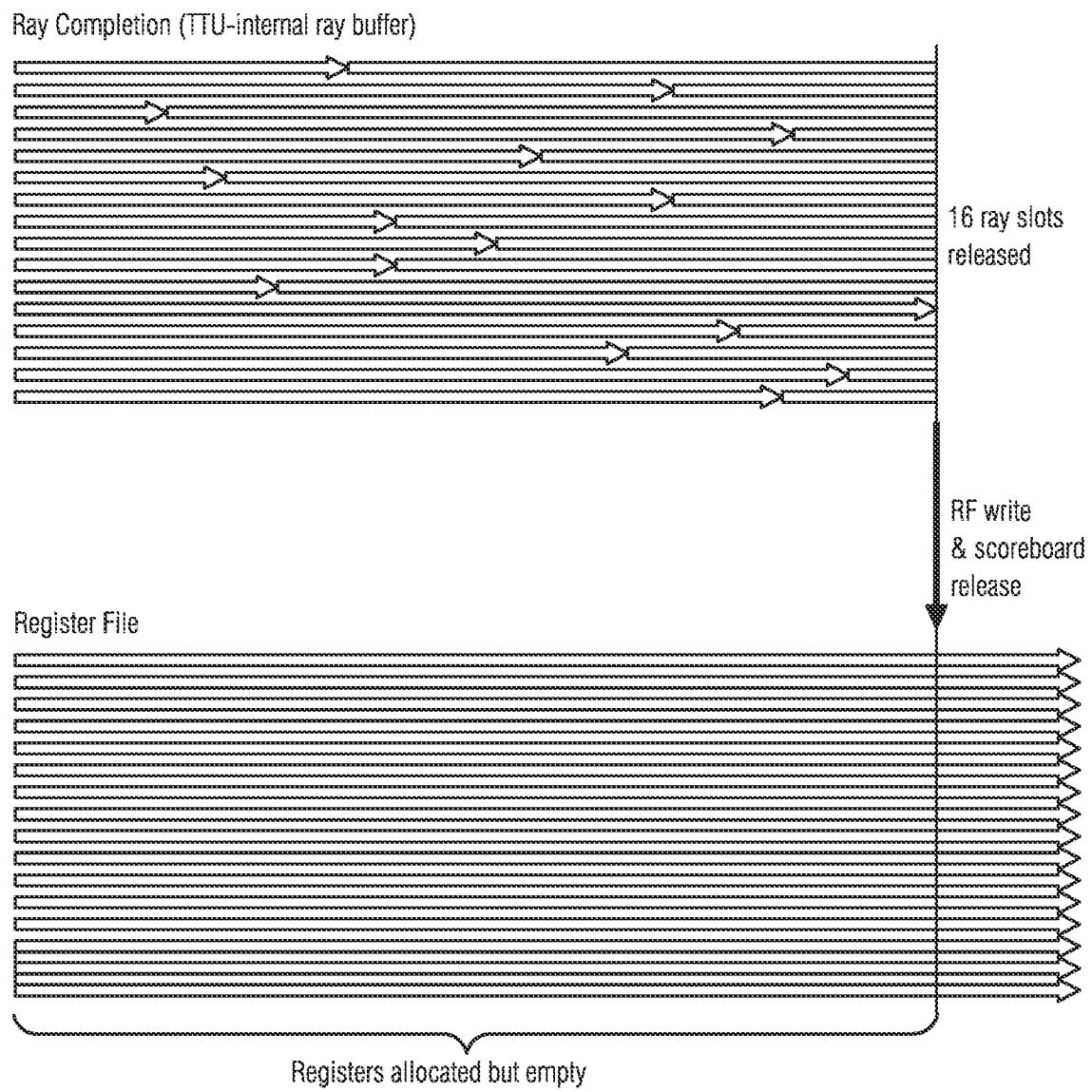
FIGS. 8A and 8B show the result output from a TTU for a group of threads being returned for an entire group and in sub groups to the multiprocessor registers, according to some example embodiments.
Figure 8B:
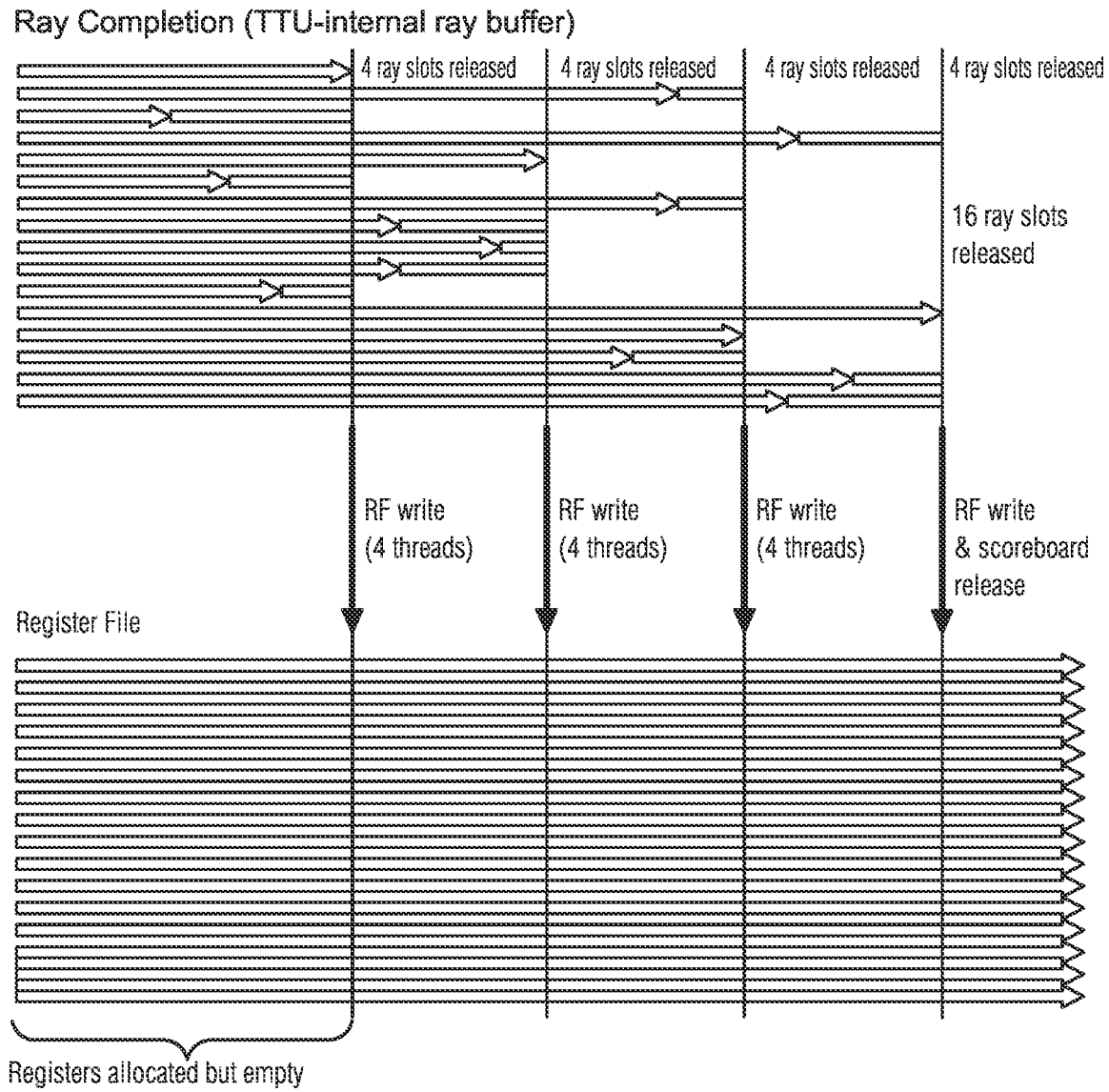

Early ray return allows ray results to be returned, with the ray slot in the TTU 138 freed, before the entire warp is ready to return. Examples of a processor and coprocessor system providing early ray return is described in co-pending U.S. application Ser. No. 16/101,247 entitled "Robust, Efficient multiprocessor-coprocessor interface", which is hereby incorporated by reference in its entirety. FIGS. 8A and 8B show the result output from the TTU 138 (a coprocessor) for a 16 thread group of threads being returned for an entire group and in groups of 4 threads to SM registers, thus freeing up the respective execution slots reserved on the TTU 138 for respective ones of the group of threads as the ray intersection test completes for each respective thread. As illustrated in FIG. 8A, when the entire group of 16 threads write results to multiprocessor registers at the same time, the TTU resources (e.g., ray slots) used by each of the 16 threads remain occupied and all the register files in the multiprocessor, even if allocated, remains idle. In contrast, FIG. 8B illustrates, the group of 16 threads being allowed to return results to the SM registers in groups of 4 threads. The time staggered return of results as each subgroup of threads completes its processing on the TTU 138 improves the utilization of the already allocated registers in the SM 132 while more quickly freeing valuable TTU 138 resources as and when respective sub groups of the threads complete their respective uses of the TTU 138. The granularity of early ray return is programmable. Early TTU resource release allows for ray slots to be used by other queries earlier, thus increasing the overall utilization of the TTU 138.

However, each return of results consumes register file (RF) bandwidth for an entire warp. That means there is a trade-off to be made between freeing up ray slots in the TTU 138 and consuming RF bandwidth to prevent either from being a bottleneck. Where that balance lies will vary (e.g., on the specific queries that are issued), but in some examples it will typically be at larger granularities like 16 (half of a full warp) or 8 (quarter of a full warp). It is unlikely to be all the way at the single thread extreme. Even within that smaller group of 8 or 16 there are still differences in traversal length which can cause shorter rays to consume ray slot resources longer than desired.

Examples of the present disclosure provide systems and methods to further free up execution resources in the TTU 138 while waiting on other queries to complete. In some examples, the present disclosure can further free up execution resources in the TTU 138 without further reducing the granularities of the early ray return. Accordingly, in some examples, the granularities of the early ray return can be maintained or increased (e.g., granularities of 16 (half of a full warp) or 8 (quarter of a full warp)) to limit consuming RF bandwidth. Examples of the present disclosure provide an interface between an SM 132 and TTU 138 configured to free up execution resources in the TTU 132, allowing the SM 132 and TTU 138 to handle intersection testing of a large number of rays. The interface provides for storing at least some of the query results in a compressed format and generating query results based on the compressed data when the query results are reported.

Example Multiprocessor/TTU Interface

Figure 9:
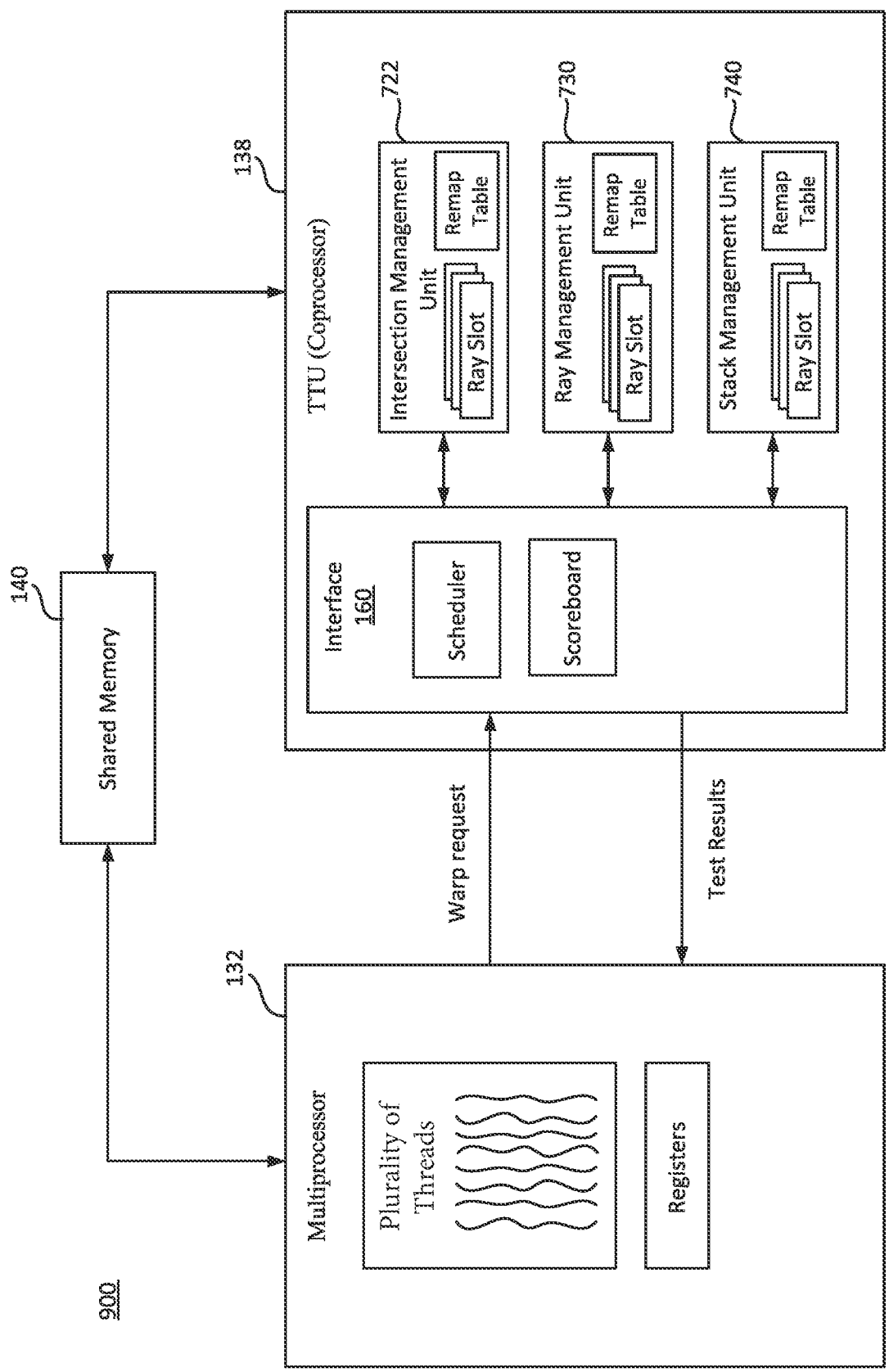
FIG. 9 shows a system including an interface between multiprocessor and TTU, according to an example embodiment.
Figure 10D:
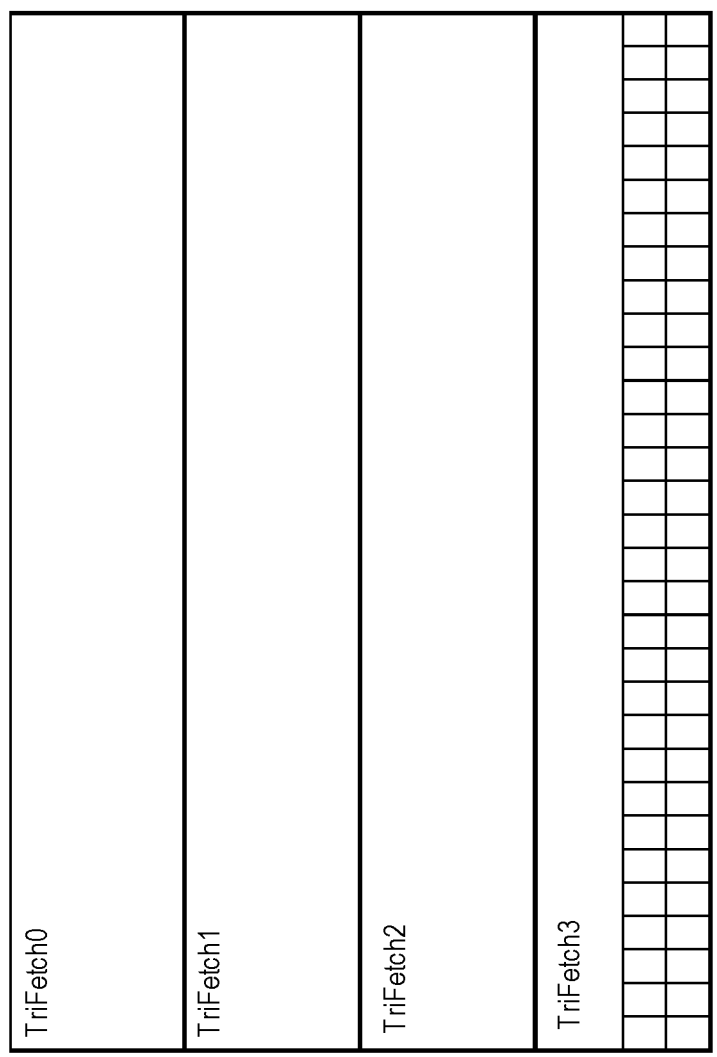

FIG. 9 shows a system 900 including an interface 160 between an SM 132 and TTU 138. In some examples, the SM 132 may be another processor and the TTU 138 may be another coprocessor. While the interface 160 is shown as being part of the TTU 138, in some examples the interface 160 or one or more component of the interface 160 may be provide outside of the TTU 138.

The SM 132 and TTU 138 may communicate via the interface 160, and both may have access to a shared memory 140. The shared memory 140, although shown as being located outside the SM 132 and TTU 138, is not limited thereto. In some embodiments, the shared memory 140 may be cache memory (e.g., such as L0/L1 cache of the TTU 138) or other memory to which the TTU 138 has only read access. The shared memory 140 may include memory locations that are used to exchange data between the SM 132 and TTU 138.

The SM 132 is configured to concurrently execute a plurality of threads, and may be further configured to command the TTU 138 to perform one or more TTU operations to accelerate the processing of one or a group of the plurality of threads scheduled to execute concurrently. The SM 132 may issue a warp for visibility tests of rays against a scene. Each thread of a warp may include a different ray intersection query.

When the TTU 138 receives the warp request, a scheduler in the interface 160 determines if resources are available to process the queries of the threads in the warp. The resources needed to process the queries include ray slots (memory or registers) to store ray information and intermediate and/or final test results. If the warp includes 32 threads, each thread including a ray intersection query, the TTU 138 will need to allocate 32 ray slots. The scheduler 160 issues a ticket for the warp and starts the queries after the ray slots become available for each of the threads including a query. If the ray slots are not available, the TTU 138 waits until other queries are completed and ray slots become available for the warp.

After the intersection test results are obtained by the TTU 138 for each of the queries in the warp, the test results are returned into the register files in the SM 132. As discussed above, because some of the queries may take longer to complete, the interface 160 may be configured to return early ray intersection results, before the entire warp is ready to return. Returning the ray intersection results early frees up ray slots in the TTU 138 to be used by other warps earlier (i.e., before completion of the entire warp) but consumes RF bandwidth for an entire warp during the partial return. With early return of ray intersection results, the ticket for the warp continues until all of the queries are complete for the ticket. When enough ray slots become available for the next warp, the scheduler issues another ticket for queries in the next warp.

A scoreboard is used to notify the SM 132 when a target operation (e.g., a full warp or partial warp) completes its result output and the results are written to the SM registers allocated for the warp. The scoreboard keeps track of the returned results and indicates to the SM 132 when other instructions can safely consume the returned results. Examples of utilizing a scoreboard to keep track of the returned results are described in co-pending U.S. application Ser. No. 16/101,247 entitled "Robust, Efficient multiprocessor-coprocessor interface", which is hereby incorporated by reference in its entirety.

Embodiments of this disclosure provide techniques to free ray slots earlier (e.g., before other results are reported to the SM 132) so that other tickets and queries can be started as soon as ray slots for the next ticket are available. Example embodiments for freeing up ray slots allow the TTU 138 to maximize the number of queries in flight in the TTU 138.

The information in the results returned to the SM 132 depend on the information requested in the query (e.g., various ray flags describing details of the query). Part of the query setup is determining what information needs to be returned. The returned results can include hit information, a pointer to whatever was hit, information about the instance it was hit under, other ray information, and traversal stacks to continue traversal if needed.

Typically, a return to the SM 132 involves reads from the RAMs in Intersection Management Unit 722, the Ray Management Unit 730, and/or the Stack Management Unit 740 to fill in fields of the return data. While a single Intersection Management Unit 722, Ray Management Unit 730, and Stack Management Unit 740 are shown in FIG. 9, examples of this disclosure are not so limited and may include a plurality of one or more of these units. Accordingly, a return to the SM 132 may include reading results from a single or a plurality of Intersection Management Units, the Ray Management Units, and/or the Stack Management Units.

FIG. 9 shows the Intersection Management Unit 722, the Ray Management Unit 730, and the Stack Management Unit 740 including ray slots associated with the respective processing unit. In some examples, each of the processing units may have its own dedicated memory that can be allocated for the queries. In other examples, a same memory may be split to provide the respective ray slots to each of the processing units. In some examples, the ray slots may be provided in a common cache.

After processing the query is complete, the interface 160 is configured to receive information for the test results (e.g., hit information, a pointer to whatever was hit, information about the instance it was hit under, other ray information, and traversal stacks to continue traversal if needed) from different locations in the TTU 138 and provide the information to the SM 132. The information is received from the different locations in the TTU 138 when the results are being returned to the SM 132. As an example, the information for the test results may be stored in the Intersection Management unit 722, the Ray Management Unit 730, and/or the Stack Management Unit 740. Until the information is returned to the SM 132, the information is stored at the different locations in the TTU 138. As described above, the test result data is returned based on completion of other queries (e.g., queries for a predetermined number of threads) of the same warp.

FIGS. 10A-10D show examples of data that may be returned to the SM 132. The hit data (discussed in more detail below with reference to FIGS. 12A-12H) may be data that is returned from the Intersection Management unit 722, the Stack Management Unit 740 or generated by the interface 160. The hit triangle parameters and hit instance data (shown in FIG. 10A) is returned from the Intersection Management unit 722. The Stack Data (shown in FIG. 10B) is returned from the Stack Management Unit 740. The transformed ray data (shown in FIG. 10C) and trifetch 0-2 data (shown in FIG. 10D) is returned from the Ray Management Unit 730. The trifetch 3 data (shown in FIG. 10D) indicating where the query is in the traversal of fetching triangles is returned from Stack Management Unit 740.

The result data stored in the different units of the TTU 138 takes up memory in each respective unit until the data is returned to the SM 132. In one example, each of the Ray Management Unit 730, the Stack Management Unit 740, and the Intersection Management Unit 722 may have a different predetermined number of bits allocated for each query.

Early Resource Release without Reporting to SM

Examples of the present disclosure provide for the allocated ray slots in the different units of the TTU 138 to be released before the data is returned to the SM 132, by storing a compressed version of the results (e.g., in the interface 160) until the results are returned to the SM 132. The results are generated by the interface 160 based on the compressed information when the data is returned to the SM 132. This is possible in situations when the data to be returned indicates specific results. Examples of when the resources in the TTU 138 can be released without returning the results to the SM 132 are discussed below.

In the negative query case where nothing is determined to be intersected by a ray, the return values for all information are known a priori. For example, when the ray is determined to not intersect anything in the query, hit information, a pointer to whatever was hit, information about the instance it was hit under, and other ray information is known. That means that when a ray both returns a miss and is terminated, the values (data shown in FIGS. 10A-10D) which are stored for that ray in the locations across the TTU 138 and are read to form the return packets are deterministic. The term "terminated" here means that there are no more actions to be taken for that ray, which is indicated by an empty traversal stack.

When nothing is intersected by a ray in the query, the interface 160 can store information indicating a miss for the query (which can be indicated by a single bit) and the allocated resources across the TTU 138 for the query can be released for use by other tickets and queries. When the results are returned to the SM 132, the interface 160 generates the data that would have been read from the resources across the TTU 138 based on the information in the interface 160 indicating a miss for the query. The information needs to be generated and returned to the SM 132 because the SM 132 is expecting for the registers in the SM to be populated with the result data, which in this case would indicate a miss.

The Early Ray Free mechanism is fundamentally a compression scheme where for some specific cases all ray storage is compressed down to a single bit. That single bit per thread can be stored in the ticket to indicate whether a ray slot was freed before returning results. Any ray slot that is to return a miss and is terminated will be freed immediately and that bit will be set for that thread in the ticket.

Later, when results are being returned for that ticket, the proper values are reconstructed. The reconstruction can be performed by the interface 160. The non-compressed storage consumes may consume over 1000 bits in the Ray Management Unit 730, the Stack Management Unit 740, and the Intersection Management Unit 722. That gives a compression ratio greater than 1000:1.

In the case of early ray slot release, interface 160 will not read from RMU, IMU, or SMU. Instead it generates the correct values for each requested return itself. The generated data, in some examples, can be pre-stored data by the interface 160 and/or logic in the interface 160 may generate the data based on the compressed version of the results.

The feature for releasing TTU resources without returning the results to the SM 132 are not solely isolated to miss queries but can be used whenever return values are known a priori. Some of these situations are dependent on the query parameters such as ray flags or mode flags for the ray.

As an example, some visibility tests care only if something was hit and not what specifically was hit. These type of queries may be referred to as any hit ray. One example application is shadow rays that test whether a point in space is in shadow or light for a specific light source. In this test, the query is not trying to identify the closest intersected primitive but if there is at least one primitive intersection, without regard to intersection location (e.g., parametric length of intersection) or what primitive was determined to be intersected by the ray.

These types of returns can also have return values known a priori. In one possible implementation, a TerminateOnAnyHit flag might control this behavior, but this still returns whatever triangle was hit that caused the termination. While that hit isn't necessarily the closest triangle, it can still be useful as an approximation in some algorithms.

In the case where which triangle was hit is not needed, examples of the present disclosure adds a new ray flag bit "tu" that allows for the same terminate-on-any-hit behavior but without returning whatever was hit. FIG. 11 shows an example of ray information that can be provided by the SM 132 for a thread. The ray information may include how the traversal is performed and how to handle hit information. The ray information may include a "t" bit to terminate on any hit and a "tu" bit to terminate-on-any-hit behavior but without returning whatever was hit. When the ray flag bit "tu" is set, the query may terminate when no hit is determined after testing each primitive identified in the query or when a first hit is identified. The return data for either of these results is known a priori, and can be generated by the interface 160 when the results are returned to the SM 132. Accordingly, when the ray flag bit "tu" is set, the resources allocated for the query will be released when no hit is determined after testing each primitive in the query or when a first hit is identified. Another bit may be stored in the ticket to indicate an early-ray-free shadow hit versus an early-ray-free miss.

Data Structures for Different Hit Types

FIGS. 12A-12H show examples of hit type data that may be retrieved from the IMU 722 or generated by the interface 160 based on compressed data indicating query results (e.g., no hit or hit of any type). The hit type data may be provided as part of the "Hit" data shown in FIG. 10. The hit type data is provided to the SM 132 when the warp results are return to the SM 132. In some examples, each of the data blocks shown in FIGS. 12A-12H may be the same size.

FIG. 12A shows an example of data that may be provided by the IMU 722 to indicate a hit and to provide intersection information. The information includes triangle id, intersection information (e.g., parametric length and/or barycentric coordinates of intersection), whether triangle is front or back facing, and whether the triangle is an opaque triangle or an alpha triangle.

FIG. 12B shows an example of data that may be generated by the interface 160 to indicate a hit but without providing details about the hit. This data structure may be generated for a shadow hit query. When the data is returned to the SM 132, all other fields including HitTrianglePtr and HitInstance, can be zero filled.

FIG. 12C shows an example of data that may be provided by the IMU 722 to indicate a node hit.

FIG. 12D shows an example of data that may be provided by the IMU 722 to indicate a triangle range hit.

FIG. 12E shows an example of data that may be provided by the IMU 722 to indicate an item range hit.

FIG. 12F shows an example of data that may be provided by the IMU 722 to indicate an instance node hit.

FIG. 12G shows an example of data that may be provided by the IMU 722 to indicate an error in performing the ray intersection test.

FIG. 12H shows an example of data that may be generated by the interface 160 to indicate a miss. In one example, the hit type in FIG. 12H may be provided with 1111 so that all the data returned for "hit type none" are ones. In another example, all of the data for the "hit type none" shown in FIG. 12H may be filed with zeroes instead of ones. When the data is returned to the SM 132, all other fields can be zero filled.

As shown in FIGS. 12A-12H each different hit type includes a type indicator indicating a type of hit that is being returned. The hit type may be indicated by one or more bits. In one example, a same number of bits may be allocated for the type indicator for a plurality of the different hit types shown in FIGS. 12A-12H. When the SM 132 receives the query results per thread, the hit type information may be used to determine how to use the returned data and which part of the returned data for the query may be ignored.

Partial TTU Resource Deallocation

Example embodiments decompose ray slots in the TTU 138 into individual components that are allocated and released independently.

As discussed above, results of a query may be stored across different locations in the TTU 138. In FIG. 9, the results of a query may be stored in the IMU 722, RMU 730 and/or SMU 740. In the examples above, when the query results stored in the IMU 722, RMU 730 and SMU 740 are released and stored in compressed format (e.g., for a query that reports a miss) in the interface 160, each of the individual components of the associated ray slot is released so that the ray slot can be used by another ticket and query. In the example discussed below, only a portion (e.g., one or more) components of the ray slot are released while one or more other components continue to store ray test results until the results of the query are returned to the SM 132. In this example, a portion of the results are stored in a compressed format in the interface 160 and a portion of the results are stored in the components of the ray slot (without compression), until the results are returned to the SM 132.

For example, for rays that terminate traversal there is no real traversal stack content to return and so the SMU 740 portion of the ray slot can be freed. While the components of the ray slot in the SMU 740 is released, the component of the ray slot in the IMU 722 and the RMU 730 may be maintained until the results of the query are returned to the SM 132. When the query results are returned to the SM 132 with other query results, the interface 160 reads the results from the components of the ray slot in the IMU 722 and the RMU 730 and generates the results that would have otherwise been read from the SMU 740. In some examples, the fields that would have been retrieved from the SMU 740 can be all zero filled by the interface 160.

In another example, in the case when no results are needed from RMU 730 (i.e., no triangle fetch or transformed ray return), the RMU 730 portion of the ray slot can be freed. In another example, hits that are in the stack or RMU 730 only don't need the IMU 722 storage, which can be freed.

Freeing any of these resources independently requires separating their allocation. All ray allocations start with all constituent components in the RMU 730, IMU 722, and SMU 740. A remap table is added in each of those units to map an interface-originated ray slot ID with the physical ray slot in each of those units. On allocation, the interface 160 updates each of those tables. On access in RMU 730, IMU 722, or SMU 740 (e.g., when the intersection results are returned to the SM 132), the remap table is accessed to determine the physical location needed. In some embodiments, information stored in the remap tables may be managed in the interface 160.

Since each ray is allocated with all components to start, the freeing of these resources is about reducing the size of any of those units (e.g., the RMU 730, the IMU 722, and/or the SMU 740). If all were the same size, there would be no need to reduce them further. For example, if the expectation is that very few returns need RMU 730 storage, then RMU 730 storage can be reduced to not cover the latency between when a ray completes and when that ray returns to the SM 132. Or for example, if most queries were expected to terminate without continued traversal and also not require returns about the ray information in RMU 730, then both SMU 740 and RMU 730 could be sized smaller to not cover that full pending-return latency.

Breaking ray slots into components for separate allocation and deallocation means that the interface 160 is extended to track the independent resources separately and also remap tables are provided in the RMU 730, IMU 722, and SMU 740. The additional area for those components is offset by the savings from area in the reduced buffers in RMU 730, IMU 722, and/or SMU 740.

As discussed above, the interface 160 receives the warps, issues the tickets and keeps track of the ray intersection testing, storage of the results and returning the results to the SM 132. FIG. 13A shows an example table of data that may be tracked by the interface 160. For each thread of a warp, the interface 160 may keep track of whether the thread is active or not, where results for the thread are stored, and whether completed queries indicate no hit or any hit.

As shown in FIGS. 13A, active thread 23 and active thread 16 may have TTU slots (i.e., ray slots) allocated and mapped to slots in the RMU, IMU and SMU. When the query for a thread is complete (based on parameters settings of the ray), the interface 160 may update information in the table for the completed query.

For inactive thread 5, the table stores information about result locations in the RMU, IMU and SMU. When the results for thread 5 are returned to the SM 132, the interface 160 may read the query results from the identified locations for thread ID 5.

For inactive thread 16, the test results indicate that there is no hit. Because there is no hit, the no hit bit in the interface 160 is set for thread 16 and the previously allocated slots for thread 16 query are released for use by other queries. When the results for thread 16 are returned to the SM 132, the interface 160 does not read from the previously allocated slots for thread 16, but generates the data returned to registers of the SM 132. Similarly, the interface 160 generated data to be returned to the SM 132 for thread 8 because the results for the query of thread 8 indicated that there was some hit.

FIG. 13A also shows that the partial results for thread 4 are stored in specific slots of the RMU and the IMU, but the data that would have been retrieved from the SMU is generated when the results for thread 4 are returned to the SM. The slot of the SMU that would have stored the results is released for use by other queries.

The mapping between the TTU slot assigned to the thread and the slots in the RMU, IMU and SMU may be provided in a remap table stored in each of the respective units shown in FIG. 9. FIG. 13B shows example mapping between TTU slots and the RMU, IMU and SMU slots. If the remap tables are provided in the respective units of the TTU 138, the mapping does not need to include in the table shown in FIG. 13A.

Interface Determining Whether Resource Allocation is Needed for a Query

In some embodiments, the interface 160 may include circuitry configured to determine whether some of the resources in the TTU 138 do not need to be allocated for a specific query. In this example, the interface 160 may determine that one or more of the components of the ray slot do not need to be allocated for the query based on information in the query (e.g., parameters of the ray or type of traversal). As an example, if the query includes a single primitive to test, the interface 160 may determine that resources in the stack management unit do not need to be allocated. The interface 160 making this determination before or at the time the resources are allocated may allow for the ticket to be issued earlier for the warp execution.

Example Ray Triangle Traversal Implementation

Figure 14:
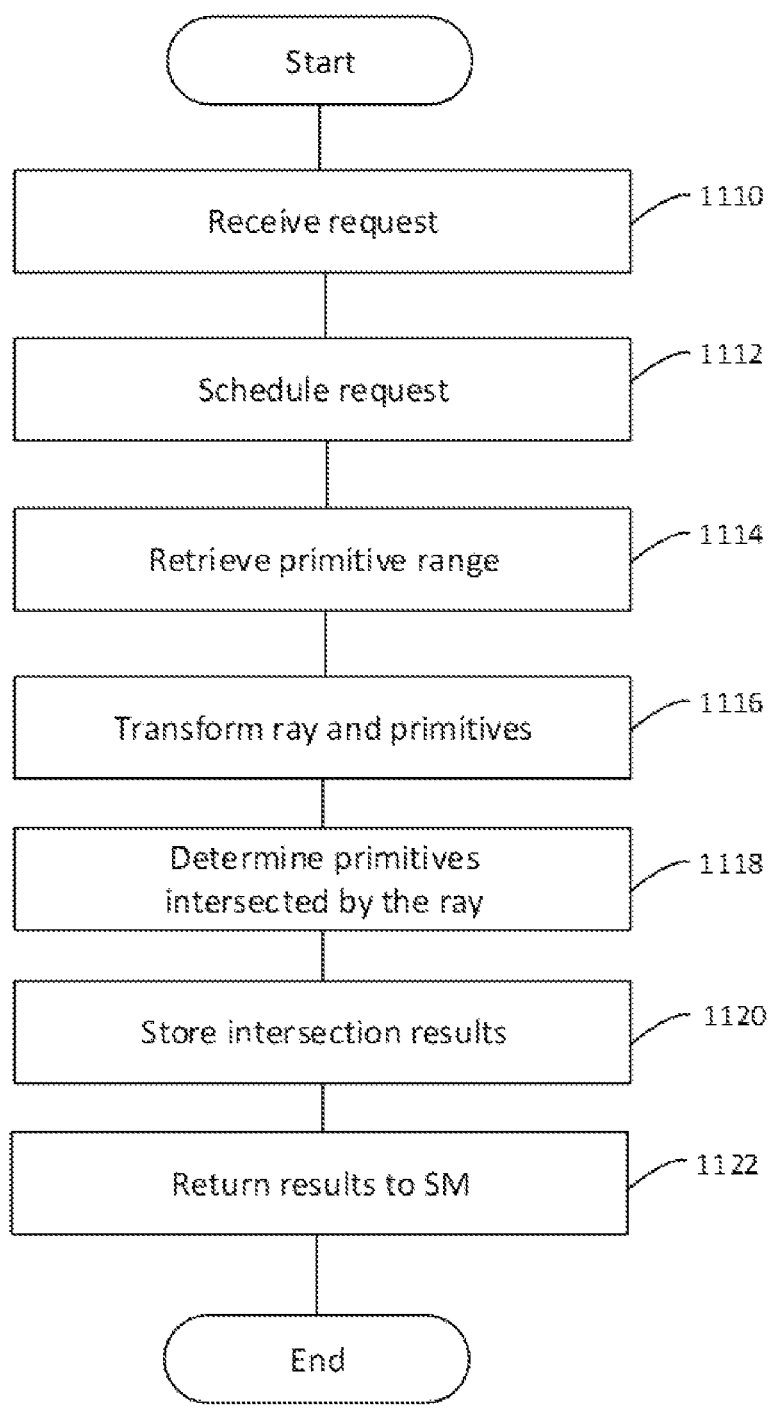
FIG. 14 illustrates a flowchart of an example non-limiting method for determining intersections between a data structure and primitives.

FIG. 14 illustrates a flowchart of an example non-limiting method for determining intersections between a data structure (e.g., a ray) and primitives. One or more operations discussed with reference to FIG. 14 may be performed by a TTU 138 disclosed in this application, but the example implementations are not so limited.

The method includes receiving a request (e.g., a query) for one or more intersections between a query data structure and a primitive range (step 1110). The request may be received from an SM 132. The request may be received as part of a warp including a plurality of threads, with each thread including a request for a ray intersection test. The request may request any hit, a nearest intersection or each intersection in the primitive range. In some embodiments, the query data structure may be a ray given by its three-coordinate origin, three-coordinate direction, and minimum and maximum values (tmin, tmax) for the parametric interval (t-parameter) along the ray (e.g., representing the segment of current interest along the ray). In some embodiments, the query may include information for defining a query data structure (e.g., a ray) that may be used by the TTU 138 to generate one or more ray parameters to test for primitive intersections with the ray. The primitive range for the request may be identified in one or more stack entries of a stack management block in the TTU 138. The stack entries may be made based on results of finding intersected leaf nodes of a BVH in the ray-complet test path of the TTU 138.

When the resources in the TTU 138 are available for execution of the requests in the warp, the interface 160 schedules the request (step 1112). Scheduling the request may include allocation of TTU resources for the request. As discussed above, a ray slot may be assigned to the request.

The primitive range is retrieved from memory (step 1114). The primitive range may be retrieved from the TTU memory (e.g., triangle cache 754 of L0 cache 750) or memory outside of the TTU 138. The primitive range may, for example, be provided in a contiguous group of cacheline-sized blocks. Each cacheline-sized block may include a header identifying the type of geometry expressed within the block and a primitive type of each primitive in the block. For example, the header may identify that the block includes triangles and may indicate whether each triangle is an alpha primitive or an opaque primitive. The header may include an alpha bit for each primitive to designate whether the respective primitive is an alpha primitive or an opaque primitive.

The method includes transforming the ray and/or the primitives (step 1116). The ray and/or primitives are transformed to simplify the 3D intersection problem and decrease the floating point resources needed in the TTU hardware to perform the intersection test.

Using the transformed ray and/or primitives, a determination is made as to which primitives are intersected by the ray (step 1118). The transformations applied to the ray and primitive simplify the intersection problem from 3D space to 2D space with simplified planar coordinates (e.g., 2D ray-relative coordinates). In the 2D space, the intersection test becomes determining if the ray intersection is inside edges of the primitive (e.g., triangle edges).

If the TTU determines an intersection, then it can also determine the coordinates of the intersection. The intersection coordinates may be provided for example by barycentric coordinates for further processing (e.g., computation of texture coordinates) by the SM 132 or in some other (e.g., future) implementations by hardware within the TTU.

The intersection results are stored (step 1120) in the TTU 138. The results may indicate whether or not the ray intersected any primitives, traversal stack state, ray information etc. The results may be stored in the slots allocated for the query of the respective processing unit. Some of the results may be stored in a compressed format (e.g., with a single bit) in the interface 160. When full or partial results are stored in the interface 160, one or more of the slots allocated for the query may be released for use by other queries.

Intersection test results for the query are returned to the SM 132 (step 1122). In one example, the TTU 138 returns a closest hit primitive to the SM 132. In one exemplary embodiment, the results returned to the SM 132 may include, for each intersected primitive, a parametric length which specifies the point along the ray where the hit occurred and attributes of the hit such as the instance ID, material ID, or which can be used by the SM to select a specific material shader and a set of resource bindings, and primitive IDs and (u,v) coordinates which can be used by the SM 132 during shading to retrieve and interpolate attributes or sample textures. In some examples, the intersection test results indicate that nothing was determined to be intersected by the ray or that something was intersected by the ray without identifying what was intersected.

The TTU 138 may return results to the SM 132 when a request completes or mid-traversal if the need should arise for SM intervention (for example, if the number of alpha hits found within a single triangle range exceeds the storage capacity for alpha hits in the result queue). If all of the primitives in the request are opaque, then the TTU 138 can return only the closest opaque primitive to the SM 132. However, if the primitives include a mixture of opaque and alpha primitives, a plurality of alpha primitives may be intersected by the ray. Each of the intersected alpha primitives may be returned to the SM 132 for further processing (e.g., to determine if there is a hit based on texture information associated with the alpha primitive). The SM 132 may use the results to build the scene, issue additional queries to the TTU 138, and/or modify previously issued queries to the TTU 138.

Returning the results to the SM 132, may include waiting for each of the requests in the warp to complete before returning the results. In other examples, the results may be returned when a predetermined number of requests in the warp are completed (e.g., 8 or 16 requests).

Returning the results for the request to the SM 132 may include the interface 160 requesting the result data stored across the TTU and/or generating the result data based on previously stored results (e.g., as compressed result data) in the interface 160. As explained above, storing the results as compressed data in the interface 160 allows for allocated TTU resources (e.g., ray slots) to be released for other warps or queries to use those resources.

Example Instancing Pipeline Implementation by TTU 138 and SM 132

For sake of completeness, the following describes how TTU 138 in example embodiments performs instancing and associated transforms.

Figure 15A:
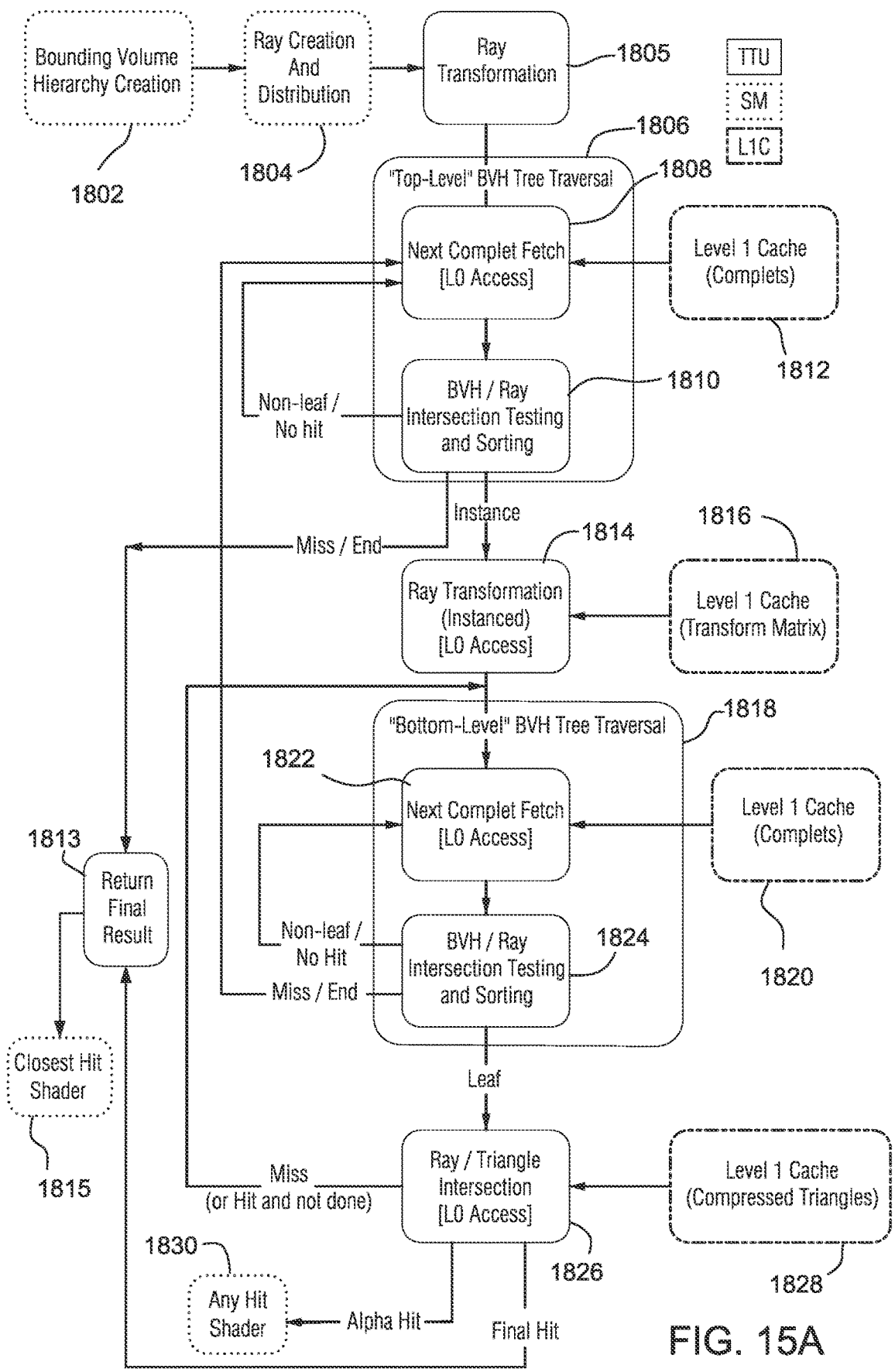
FIGS. 15A and 15B illustrate more detailed ray tracing pipelines.

The FIG. 15A more detailed diagram of a ray-tracing pipeline flowchart shows the data flow and interaction between components for a representative use case: tracing rays against a scene containing geometric primitives, with instance transformations handled in hardware. In one example non-limiting embodiment, the ray-tracing pipeline of FIG. 15A is essentially software-defined (which in example embodiments means it is determined by the SMs 132) but makes extensive use of hardware acceleration by TTU 138. Key components include the SM 132 (and the rest of the compute pipeline), the TTU 138 (which serves as a coprocessor to SM), and the L1 cache and downstream memory system, from which the TTU fetches BVH and triangle data.

The pipeline shown in FIG. 15A shows that bounding volume hierarchy creation 1802 can be performed ahead of time by a development system. It also shows that ray creation and distribution 1804 are performed or controlled by the SM 132 or other software in the example embodiment, as shading (which can include lighting and texturing). The example pipeline includes a "top level" BVH tree traversal 1806, ray transformation 1814, "bottom level" BVH tree traversal 1818, and a ray/triangle (or other primitive) intersection 1826 that are each performed by the TTU 138. These do not have to be performed in the order shown, as handshaking between the TTU 138 and the SM 132 determines what the TTU 138 does and in what order.

The SM 132 presents one or more rays to the TTU 138 at a time. Each ray the SM 132 presents to the TTU 138 for traversal may include the ray's geometric parameters, traversal state, and the ray's ray flags, mode flags and ray operations information. In an example embodiment, a ray operation (RayOp) provides or comprises an auxiliary arithmetic and/or logical test to suppress, override, and/or allow storage of an intersection. The traversal stack may also be used by the SM 132 to communicate certain state information to the TTU 138 for use in the traversal. A new ray query may be started with an explicit traversal stack. For some queries, however, a small number of stack initializers may be provided for beginning the new query of a given type, such as, for example: traversal starting from a complet; intersection of a ray with a range of triangles; intersection of a ray with a range of triangles, followed by traversal starting from a complet; vertex fetch from a triangle buffer for a given triangle, etc. In some embodiments, using stack initializers instead of explicit stack initialization improves performance because stack initializers require fewer streaming processor registers and reduce the number of parameters that need to be transmitted from the streaming processor to the TTU.

In the example embodiment, a set of mode flags the SM 132 presents with each query (e.g., ray) may at least partly control how the TTU 138 will process the query when the query intersects the bounding volume of a specific type or intersects a primitive of a specific primitive type. The mode flags the SM 132 provides to the TTU 138 enable the ability by the SM and/or the application to e.g., through a RayOp, specify an auxiliary arithmetic or logical test to suppress, override, or allow storage of an intersection. The mode flags may for example enable traversal behavior to be changed in accordance with such aspects as, for example, a depth (or distance) associated with each bounding volume and/or primitive, size of a bounding volume or primitive in relation to a distance from the origin or the ray, particular instances of an object, etc. This capability can be used by applications to dynamically and/or selectively enable/disable sets of objects for intersection testing versus specific sets or groups of queries, for example, to allow for different versions of models to be used when application state changes (for example, when doors open or close) or to provide different versions of a model which are selected as a function of the length of the ray to realize a form of geometric level of detail, or to allow specific sets of objects from certain classes of rays to make some layers visible or invisible in specific views.

In addition to the set of mode flags which may be specified separately for the ray-complet intersection and for ray-primitive intersections, the ray data structure may specify other RayOp test related parameters, such as ray flags, ray parameters and a RayOp test. The ray flags can be used by the TTU 138 to control various aspects of traversal behavior, back-face culling, and handling of the various child node types, subject to a pass/fail status of an optional RayOp test. RayOp tests add flexibility to the capabilities of the TTU 138, at the expense of some complexity. The TTU 138 reserves a "ray slot" for each active ray it is processing, and may store the ray flags, mode flags and/or the RayOp information in the corresponding ray slot buffer within the TTU during traversal.

In the example shown in FIG. 15A, the TTU 138 performs a top level tree traversal 1806 and a bottom level tree traversal 1818. In the example embodiment, the two level traversal of the BVH enables fast ray tracing responses to dynamic scene changes.

In some embodiments, upon entry to top level tree traversal, or in the top level tree traversal, an instance node 1805 specifying a top level transform is encountered in the BVH. The instance node 1805 indicates to the TTU that the subtree rooted at the instance node 1805 is aligned to an alternate world space coordinate system for which the transform from the world space is defined in the instance node 1805.

In response to traversing instance node 1805, TTU transforms the ray (or rays) received from the SM from world space to the alternate world space.

Ray transformation 1814 provides the appropriate transition from the top level tree traversal 1806 to the bottom level tree traversal 1818 by transforming the ray, which may be used in the top level traversal in a first coordinate space (e.g., world space), to a different coordinate space (e.g., object space) of the BVH of the bottom level traversal. An example BVH traversal technique using a two level traversal is described in previous literature, see, e.g., Woop, "A Ray Tracing Hardware Architecture for Dynamic Scenes", Universitat des Saarlandes, 2004, but embodiments are not limited thereto.

Example Top Level Tree Traversal

The top level tree traversal 1806 by TTU 138 receives complets from the L1 cache 1812, and provides an instance to the ray transformation 1814 for transformation, or a miss/end output 1813 to the SM 132 for closest hit shader 1815 processing by the SM (this block can also operate recursively based on non-leaf nodes/no hit conditions). In the top level tree traversal 1806, a next complet fetch step 1808 fetches the next complet to be tested for ray intersection in step 1810 from the memory and/or cache hierarchy and ray-bounding volume intersection testing is done on the bounding volumes in the fetched complet.

Figure 15B:
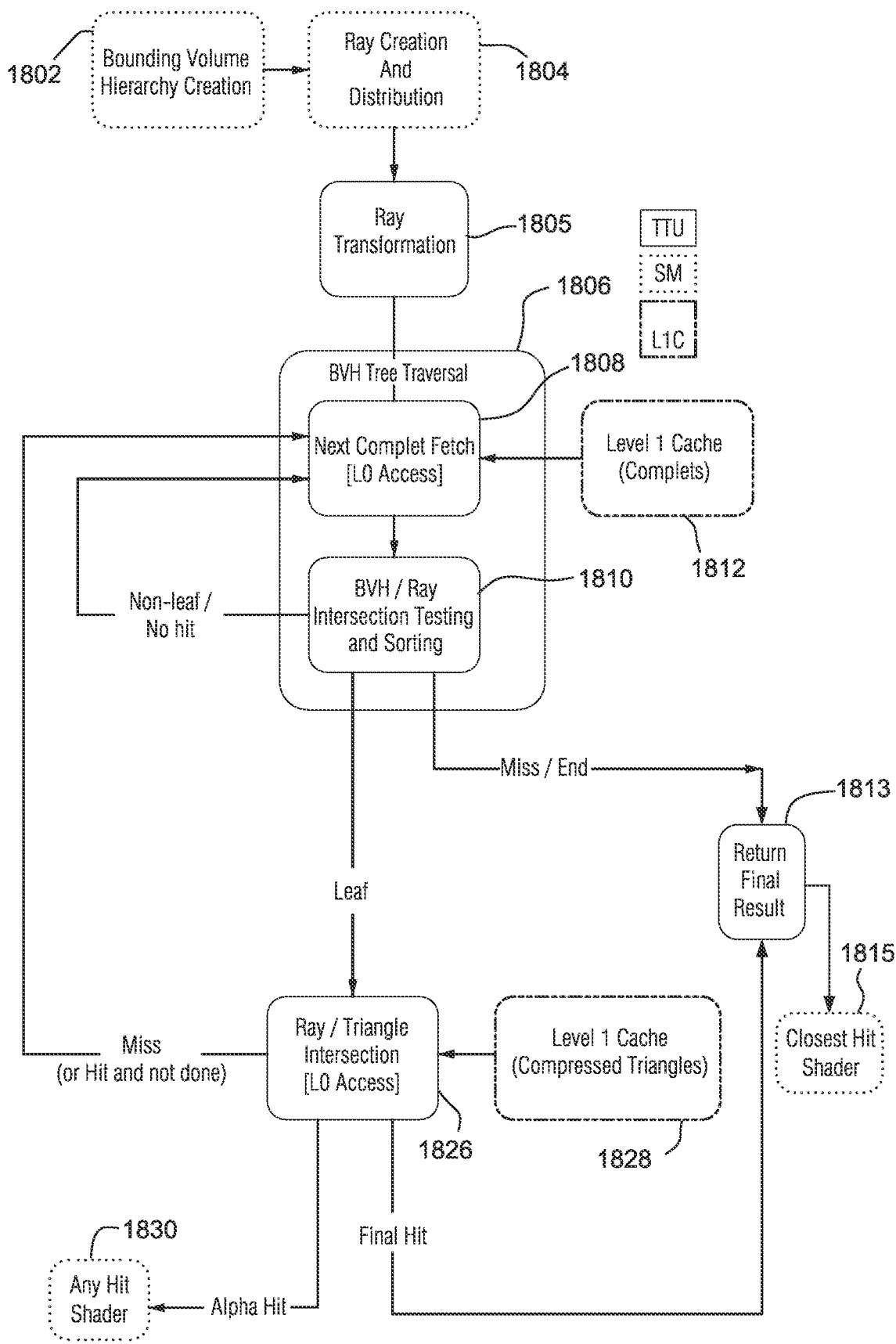

As described above, an instance node connects one BVH to another BVH which is in a different coordinate system. When a child of the intersected bounding volume is an instance node, the ray transformation 1814 is able to retrieve an appropriate transform matrix from the L1 cache 1816. The TTU 138, using the appropriate transform matrix, transforms the ray to the coordinate system of the child BVH. U.S. patent application Ser. No. 14/697,480, which is already incorporated by reference, describes transformation nodes that connect a first set of nodes in a tree to a second set of nodes where the first and second sets of nodes are in different coordinate systems. The instance nodes in example embodiments may be similar to the transformation nodes in U.S. application Ser. No. 14/697,480. In an alternative, non-instancing mode of TTU 138 shown in FIG. 15B, the TTU does not execute a "bottom" level tree traversal 1818 and noninstanced tree BVH traversals are performed by blocks 1808, 1810 e.g., using only one stack. The TTU 138 can switch between the FIG. 15A instanced operations and the FIG. 15B non-instanced operations based on what it reads from the BVH and/or query type. For example, a specific query type may restrict the TTU to use just the non-instanced operations. In such a query, any intersected instance nodes would be returned to the SM.

In some non-limiting embodiments, ray-bounding volume intersection testing in step 1810 is performed on each bounding volume in the fetched complet before the next complet is fetched. Other embodiments may use other techniques, such as, for example, traversing the top level traversal BVH in a depth-first manner. U.S. Pat. No. 9,582,607, already incorporated by reference, describes one or more complet structures and contents that may be used in example embodiments. U.S. Pat. No. 9,582,607 also describes an example traversal of complets.

When a bounding volume is determined to be intersected by the ray, the child bounding volumes (or references to them) of the intersected bounding volume are kept track of for subsequent testing for intersection with the ray and for traversal. In example embodiments, one or more stack data structures is used for keeping track of child bounding volumes to be subsequently tested for intersection with the ray. In some example embodiments, a traversal stack of a small size may be used to keep track of complets to be traversed by operation of the top level tree traversal 1806, and primitives to be tested for intersection, and a larger local stack data structure can be used to keep track of the traversal state in the bottom level tree traversal 1818.

Example Bottom Level Tree Traversal

In the bottom level tree traversal 1818, a next complet fetch step 1822 fetches the next complet to be tested for ray intersection in step 1824 from the memory and/or cache hierarchy 1820 and ray-bounding volume intersection testing is done on the bounding volumes in the fetched complet. The bottom level tree traversal, as noted above, may include complets with bounding volumes in a different coordinate system than the bounding volumes traversed in the upper level tree traversal. The bottom level tree traversal also receives complets from the L1 cache and can operate recursively or iteratively within itself based on non-leaf/no-hit conditions and also with the top level tree traversal 1806 based on miss/end detection. Intersections of the ray with the bounding volumes in the lower level BVH may be determined with the ray transformed to the coordinate system of the lower level complet retrieved. The leaf bounding volumes found to be intersected by the ray in the lower level tree traversal are then provided to the ray/triangle intersection 1826.

The leaf outputs of the bottom level tree traversal 1818 are provided to the ray/triangle intersection 1826 (which has L0 cache access as well as ability to retrieve triangles via the L1 cache 1828). The L0 complet and triangle caches may be small read-only caches internal to the TTU 138. The ray/triangle intersection 1826 may also receive leaf outputs from the top level tree traversal 1806 when certain leaf nodes are reached without traversing an instanced BVH.

After all the primitives in the primitive range have been processed, the Intersection Management Unit inspects the state of the result Queue and crafts packets to send to the Stack Management Unit and/or Ray Management Unit to update the ray's attributes and traversal state, set up the ray's next traversal step, and/or return the ray to the SM 132 (if necessary). If the result queue contains opaque or alpha intersections found during the processing of the primitive range then the Intersection Management Unit signals the parametric length (t) of the nearest opaque intersection in the result queue to the ray management unit to record as the ray's tmax to shorten the ray. To update the traversal state to set up the ray's next traversal step the Intersection Management Unit signals to the Stack Management Unit whether an opaque intersection from the primitive range is present in the resultQueue, whether one or more alpha intersections are present in the result queue, whether the resultQueue is full, whether additional alpha intersections were found in the primitive range that have not been returned to the SM and which are not present in the resultQueue, and the index of the next alpha primitive in the primitive range for the ray to test after the SM consumes the contents of the resultQueue (the index of the next primitive in the range after the alpha primitive with the highest memory-order from the current primitive range in the result queue).

When the Stack Management Unit 740 receives the packet from Intersection Management Unit 722, the Stack Management Unit 740 inspects the packet to determine the next action required to complete the traversal step and start the next one. If the packet from Intersection Management Unit 722 indicates an opaque intersection has been found in the primitive range and the ray mode bits indicate the ray is to finish traversal once any intersection has been found the Stack Management Unit 740 returns the ray and its results queue to the SM with traversal state indicating that traversal is complete (a done flag set and/or an empty top level and bottom level stack). If the packet from Intersection Management Unit 722 indicates that there are opaque or alpha intersection in the result queue and that there are remaining alpha intersections in the primitive range not present in the result queue that were encountered by the ray during the processing of the primitive range that have not already been returned to the SM, the Stack Management Unit 740 returns the ray and the result queue to the SM with traversal state modified to set the cull opaque bit to prevent further processing of opaque primitives in the primitive range and the primitive range starting index advanced to the first alpha primitive after the highest alpha primitive intersection from the primitive range returned to the SM in the ray's result queue. If the packet from Intersection Management Unit 722 indicates that no opaque or alpha intersections were found when the ray processed the primitive range the Stack Management Unit 740 pops the top of stack entry (corresponding to the finished primitive range) off the active traversal stack. If the packet from Stack Management Unit 740 indicates that either there are opaque intersections in the result queue and the ray mode bits do not indicate that the ray is to finish traversal once any intersection has been found and/or there are alpha intersections in the result queue, but there were no remaining alpha intersections found in the primitive range not present in the result queue that have not already been returned to the SM, the Stack Management Unit 740 pops the top of stack entry (corresponding to the finished primitive range) off the active traversal stack and modifies the contents of the result queue to indicate that all intersections present in the result queue come from a primitive range whose processing was completed.

If the active stack is the bottom stack, and the bottom stack is empty the Stack Management Unit 740 sets the active stack to the top stack. If the top stack is the active stack, and the active stack is empty, then the Stack Management Unit 740 returns the ray and its result queue to the SM with traversal state indicating that traversal is complete (a done flag set and/or an empty top level and bottom level stack). If the active stack contains one or more stack entries, then the Stack Management Unit 740 inspects the top stack entry and starts the next traversal step. Testing of primitive and/or primitive ranges for intersections with a ray and returning results to the SM 132 are described in co-pending U.S. application Ser. No. 16/101,148 entitled "Conservative Watertight Ray Triangle Intersection" and U.S. application Ser. No. 16/101,196 entitled "Method for Handling Out-of-Order Opaque and Alpha Ray/Primitive Intersections", which are hereby incorporated by reference in their entireties.

Example Image Generation Pipeline Including Ray Tracing

While the above disclosure is framed in the specific context of computer graphics and visualization, ray tracing and the disclosed TTU could be used for a variety of applications beyond graphics and visualization. Non-limiting examples include sound propagation for realistic sound synthesis, simulation of sonar systems, design of optical elements and systems, particle transport simulation (e.g., for medical physics or experimental high-energy physics), general wave propagation simulation, comparison to LIDAR data for purposes e.g., of robot or vehicle localization, and others. OptiX™ has already been used for some of these application areas in the past.

For example, the ray tracing and other capabilities described above can be used in a variety of ways. For example, in addition to being used to render a scene using ray tracing, they may be implemented in combination with scan conversion techniques such as in the context of scan converting geometric building blocks (i.e., polygon primitives such as triangles) of a 3D model for generating image for display (e.g., on display 150 illustrated in FIG. 4).

Figure 16:
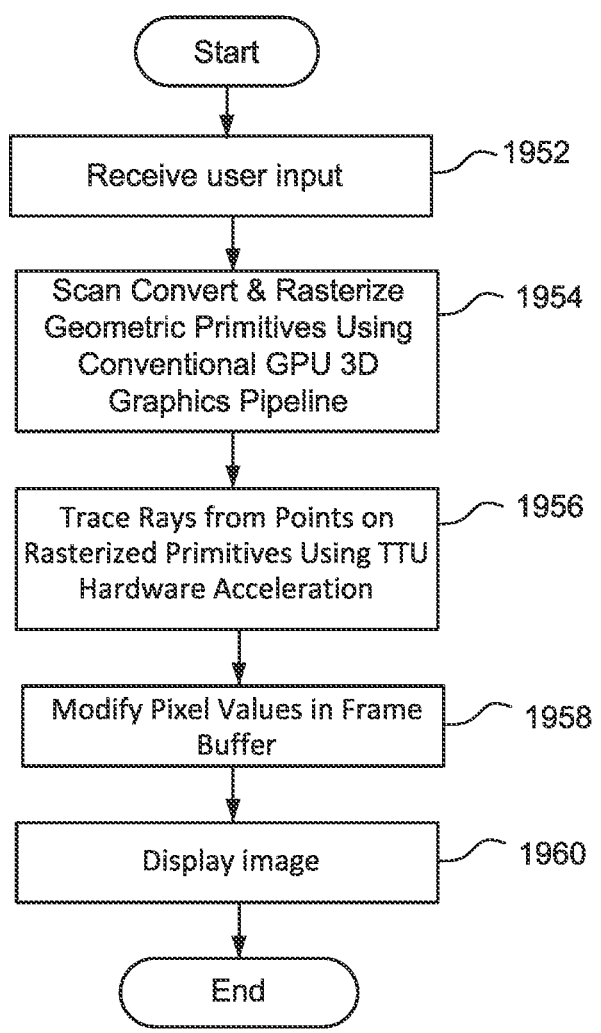
FIG. 16 is a flowchart of an example process to generate an image.

Meanwhile, however, the technology herein provides advantages when used to produce images for virtual reality, augmented reality, mixed reality, video games, motion and still picture generation, and other visualization applications. FIG. 16 illustrates an example flowchart for processing primitives to provide image pixel values of an image, in accordance with an embodiment. As FIG. 16 shows, an image of a 3D model may be generated in response to receiving a user input (Step 1952). The user input may be a request to display an image or image sequence, such as an input operation performed during interaction with an application (e.g., a game application). In response to the user input, the system performs scan conversion and rasterization of 3D model geometric primitives of a scene using conventional GPU 3D graphics pipeline (Step 1954). The scan conversion and rasterization of geometric primitives may include for example processing primitives of the 3D model to determine image pixel values using conventional techniques such as lighting, transforms, texture mapping, rasterization and the like as is well known to those skilled in the art. The generated pixel data may be written to a frame buffer.

In step 1956, one or more rays may be traced from one or more points on the rasterized primitives using TTU hardware acceleration. The rays may be traced in accordance with the one or more ray-tracing capabilities disclosed in this application. Based on the results of the ray tracing, the pixel values stored in the buffer may be modified (Step 1958). Modifying the pixel values may in some applications for example improve the image quality by, for example, applying more realistic reflections and/or shadows. An image is displayed (Step 1960) using the modified pixel values stored in the buffer.

In one example, scan conversion and rasterization of geometric primitives may be implemented using the processing system described above, and ray tracing may be implemented by the SM's 132 using the TTU architecture described in relation to FIG. 7, to add further visualization features (e.g., specular reflection, shadows, etc.). FIG. 16 is just a non-limiting example—the SM's 132 could employ the described TTU by itself without texture processing or other conventional 3D graphics processing to produce images, or the SM's could employ texture processing and other conventional 3D graphics processing without the described TTU to produce images. The SM's can also implement any desired image generation or other functionality in software depending on the application to provide any desired programmable functionality that is not bound to the hardware acceleration features provided by texture mapping hardware, tree traversal hardware or other graphics pipeline hardware.

The TTU 138 in some embodiments is stateless, meaning that no architectural state is maintained in the TTU between queries. At the same time, it is often useful for software running on the SM 1840 to request continuation of a previous query, which implies that relevant state should be written to registers by the TTU 138 and then passed back to the TTU in registers (often in-place) to continue. This state may take the form of a traversal stack that tracks progress in the traversal of the BVH.

A small number of stack initializers may also be provided for beginning a new query of a given type, for example:
Traversal starting from a complet
Intersection of a ray with a range of triangles
Intersection of a ray with a range of triangles, followed by traversal starting from a complet
Vertex fetch from a triangle buffer for a given triangle
Optional support for instance transforms in front of the "traversal starting from a complet" and "intersection of a ray with a range of triangles".

Vertex fetch is a simple query that may be specified with request data that consists of a stack initializer and nothing else. Other query types may require the specification of a ray, beam or another geometric object, along with the stack or stack initializer and various ray flags describing details of the query. A ray is given by its three-coordinate origin, three-coordinate direction, and minimum and maximum values for the t-parameter along the ray. A beam is additionally given by a second origin and direction.

Various ray flags can be used to control various aspects of traversal behavior, back-face culling, and handling of the various child node types, subject to a pass/fail status of an optional rayOp test. RayOps add considerable flexibility to the capabilities of the TTU. In some example embodiments, the RayOps portion introduces two Ray Flag versions can be dynamically selected based on a specified operation on data conveyed with the ray and data stored in the complet. To explore such flags, it's first helpful to understand the different types of child nodes allowed within a BVH, as well as the various hit types that the TTU 138 can return to the SM. Example node types are:

A child complet (i.e., an internal node)
By default, the TTU 138 continues traversal by descending into child complets.
A triangle range, corresponding to a contiguous set of triangles within a triangle buffer
(1) By default, triangle ranges encountered by a ray are handled natively by the TTU 138 by testing the triangles for intersection and shortening the ray accordingly. If traversal completes and a triangle was hit, default behavior is for the triangle ID to be returned to SM 1840, along with the t-value and barycentric coordinates of the intersection. This is the "Triangle" hit type.
(2) By default, intersected triangles with the alpha bit set are returned to SM 1840 even if traversal has not completed. The returned traversal stack contains the state required to continue traversal if software determines that the triangle was in fact transparent.
(3) Triangle intersection in some embodiments is not supported for beams, so encountered triangle ranges are by default returned to SM 1840 as a "TriRange" hit type, which includes a pointer to the first triangle block overlapping the range, parameters specifying the range, and the t-value of the intersection with the leaf bounding box.
An item range, consisting of an index (derived from a user-provided "item range base" stored in the complet) and a count of items.
By default, item ranges are returned to SM 1840 as an "ItemRange" hit type, consisting of for example an index, a count, and the t-value of the intersection with the leaf bounding box.
An instance node.
The TTU 138 in some embodiments can handle one level of instancing natively by transforming the ray into the coordinate system of the instance BVH. Additional levels of instancing (or every other level of instancing, depending on strategy) may be handled in software (or in other embodiments, the TTU 138 hardware can handle two, three or more levels of instancing). The "InstanceNode" hit type is provided for this purpose, consisting of a pointer to the instance node and the tvalue of the intersection with the leaf bounding box. In other implementations, the hardware can handle two, three or more levels of instancing.

In addition to the node-specific hit types, a generic "NodeRef" hit type is provided that consists of a pointer to the parent complet itself, as well as an ID indicating which child was intersected and the t-value of the intersection with the bounding box of that child.

An "Error" hit type may be provided for cases where the query or BVH was improperly formed or if traversal encountered issues during traversal.

A "None" hit type may be provided for the case where the ray or beam misses all geometry in the scene.

How the TTU handles each of the four possible node types is determined by a set of node-specific mode flags set as part of the query for a given ray. The "default" behavior mentioned above corresponds to the case where the mode flags are set to all zeroes.

Alternative values for the flags allow for culling all nodes of a given type, returning nodes of a given type to SM as a NodeRef hit type, or returning triangle ranges or instance nodes to SM using their corresponding hit types, rather than processing them natively within the TTU 138.

Additional mode flags may be provided for control handling of alpha triangles.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Furthermore, images generated applying one or more of the techniques disclosed herein may be used to train, test, or certify deep neural networks (DNNs) used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

All patents & publications cited above are incorporated by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A ray tracing hardware method comprising:
   receiving a plurality of thread requests, each of the plurality of thread requests including a query;
   for each query, allocating resources for storing query results;
   concurrently performing, for the plurality of thread requests, an intersection test between a ray and a portion of a scene identified in the query to provide an intersection test result for each of the queries;
   for each query, determining, based on the intersection test result, whether to store the intersection test result in the allocated resource for the query;
   for each query, selecting, based on the intersection test result, whether to report an intersection test result for the query using data stored outside of the allocated resources and that was predetermined before the intersection test was performed; and
   reporting the intersection test results for the plurality of thread requests to the cooperating processor based on the selection.

2. The ray tracing hardware method of claim 1, wherein the intersection test results are concurrently reported for the plurality of thread requests.

3. The ray tracing hardware method of claim 1, wherein the intersection test results are concurrently reported in groups for two or more thread requests of the plurality of thread requests.

4. The ray tracing hardware method of claim 1, wherein the intersection test results are concurrently reported for a portion of the plurality of thread requests when the intersection test is completed for a predetermined number of queries.

5. The ray tracing hardware method of claim 1, wherein the data that was predetermined before the intersection test was performed indicates that the intersection test result is a miss between the ray and the portion of the scene.

6. A coprocessor coupled to a processor and comprising circuitry configured to perform operations comprising:
   receiving, from the processor, a plurality of thread requests, each of the plurality of thread requests including a query;
   for each query, allocating resources for storing query results;
   concurrently performing, for the plurality of thread requests, an intersection test between a ray and a portion of a scene identified in the query to provide an intersection test result for each of the queries;
   for each query, determining, based on the intersection test result, whether to store the intersection test result in the allocated resource for the query;
   for each query, selecting, based on the intersection test result, whether to report an intersection test result for the query using data stored outside of the allocated resources and that was predetermined before the intersection test was performed; and
   reporting the intersection test results for the plurality of thread requests to the cooperating processor based on the selection.

7. The coprocessor of claim 6, wherein the intersection test results are concurrently reported for the plurality of thread requests.

8. The coprocessor of claim 6, wherein the intersection test results are concurrently reported in groups for two or more thread requests of the plurality of thread requests.

9. The coprocessor of claim 6, wherein the intersection test results are concurrently reported for a portion of the plurality of thread requests when the intersection test is completed for a predetermined number of queries.

10. The coprocessor of claim 6, wherein the data that was predetermined before the intersection test was performed indicates that the intersection test result is a miss between the ray and the portion of the scene.

11. A coprocessor coupled to a processor and comprising circuitry configured to perform operations comprising:
  receiving, from the processor, a plurality of thread requests, each thread request including information defining a ray and a data structure to test for primitive intersections with the ray;
  concurrently processing the plurality of thread requests to determine, for each thread request, whether one or more primitives are intersected by the ray; and
  when processing for a predetermined number of thread requests is complete, concurrently reporting the processing results for the predetermined number of thread request to the processor, wherein the predetermined number is greater than one and less than the number of the plurality of thread requests.

12. The coprocessor of claim 11, wherein the circuitry is further configured to perform operations comprising:
  for each thread request, allocating resources for storing the processing results;
  storing the processing result in the allocated resources when the ray is determined to intersect at least one of the primitives in the thread request; and
  releasing the allocated resources for the thread request and storing a compressed representation of the intersection result outside of the allocated resources for the thread request when the ray is determined to intersect none of the primitives identified in the thread request.

13. The coprocessor of claim 11, wherein the circuitry is further configured to perform operations comprising:
  for each thread request, allocating resources for storing the processing results;
  storing the processing result in the allocated resources when the ray is determined to intersect at least one of the primitives in the thread request; and
  releasing the allocated resources for thread requests for which the processing results are reported to the processor or when a determination is made that the ray intersects none of the primitives in the thread request.

14. A ray tracing hardware method comprising:
  receiving, from a processor coupled to a ray tracing hardware, a plurality of thread requests, each thread request including information defining a ray and a data structure to test for primitive intersections with the ray;
  concurrently processing the plurality of thread requests to determine, for each thread request, whether one or more primitives are intersected by the ray; and
  when processing for a predetermined number of thread requests is complete, concurrently reporting the processing results for the predetermined number of thread request to the processor, wherein the predetermined number is greater than one and less than the number of the plurality of thread requests.

15. The ray tracing hardware method of claim 14, further comprising:
  for each thread request, allocating resources for storing the processing results;
  storing the processing result in the allocated resources when the ray is determined to intersect at least one of the primitives in the thread request; and
  releasing the allocated resources for the thread request and storing a compressed representation of the intersection result outside of the allocated resources for the thread request when the ray is determined to intersect none of the primitives identified in the thread request.

16. The ray tracing hardware method of claim 14, further comprising:
  for each thread request, allocating resources for storing the processing results;
  storing the processing result in the allocated resources when the ray is determined to intersect at least one of the primitives in the thread request; and
  releasing the allocated resources for thread requests for which the processing results are reported to the processor or when a determination is made that the ray intersects none of the primitives in the thread request.

* * * * *